Sept. 15, 1964 G. KIPER ETAL 3,148,602

AUTOMATIC CAMERAS

Filed Dec. 28, 1960 14 Sheets-Sheet 1

INVENTOR.

GERD KIPER
FRANZ JAKOB
ULRICH W. AUER
ROLAND KNORR
FRIDOLIN HENNIG

BY

Michael S. Striker
Attorney

INVENTOR.
GERD KIPER
FRANZ JAKOB
ULRICH W. AUER
ROLAND KNORR
FRIDOLIN HENNIG

BY Michael S. Striker
Attorney

INVENTOR.
GERD KIPER
FRANZ JAKOB
ULRICH W. AUER
ROLAND KNORR
FRIDOLIN HENNIG

BY Michael S. Striker
Attorney

INVENTOR.
GERD KIPER
FRANZ JAKOB
ULRICH W. AUER
ROLAND KNORR
FRIDOLIN HENNIG
BY
Michael S. Striker
Attorney Sept. 15, 1964 G. KIPER ETAL 3,148,602

AUTOMATIC CAMERAS

Filed Dec. 28, 1960 14 Sheets-Sheet 5

INVENTOR.

GERD KIPER
FRANZ JAKOB
ULRICH W. AUER
ROLAND KNORR
FRIDOLIN HENNIG

BY Michael S. Striker
Attorney

INVENTOR.
GERD KIPER
FRANZ JAKOB
ULRICH W. AUER
ROLAND KNORR
FRIDOLIN HENNIG

BY Michael S. Striker
Attorney

Sept. 15, 1964 G. KIPER ETAL 3,148,602

AUTOMATIC CAMERAS

Filed Dec. 28, 1960 14 Sheets-Sheet 7

INVENTOR.

BY Michael S. Striker
Attorney

GERD KIPER
FRANZ JAKOB
ULRICH W. AUER,
ROLAND KNORR
FRIDOLIN HENNIG

Sept. 15, 1964 G. KIPER ETAL 3,148,602

AUTOMATIC CAMERAS

Filed Dec. 28, 1960 14 Sheets-Sheet 8

INVENTOR.

GERD KIPER
FRANZ JAKOB
ULRICH W. AUER
ROLAND KNORR
FRIDOLIN HENNIG

BY

Michael S. Striker
Attorney

Sept. 15, 1964 G. KIPER ETAL 3,148,602

AUTOMATIC CAMERAS

Filed Dec. 28, 1960 14 Sheets-Sheet 9

INVENTOR.

GERD KIPER
FRANZ JAKOB
ULRICH W. AUER
ROLAND KNORR
FRIDOLIN HENNIG

BY Michael S. Striker
Attorney

Sept. 15, 1964 G. KIPER ETAL 3,148,602

AUTOMATIC CAMERAS

Filed Dec. 28, 1960 14 Sheets-Sheet 10

INVENTOR.

GERD KIPER
FRANZ JAKOB
ULRICH W. AUER
ROLAND KNORR
FRIDOLIN HENNIG

BY Michael S. Striker
Attorney

Sept. 15, 1964 G. KIPER ETAL 3,148,602

AUTOMATIC CAMERAS

Filed Dec. 28, 1960 14 Sheets-Sheet 11

INVENTOR.
GERD KIPER
FRANZ JAKOB
ULRICH W. AUER
ROLAND KNORR
FRIDOLIN HENNIG

BY Michael S. Striker
Attorney

INVENTOR.
GERD KIPER
FRANZ JAKOB
ULRICH W. AUER
ROLAND KNORR
FRIDOLIN HENNIG
BY
Michael S. Striker
Attorney

AUTOMATIC CAMERAS

Filed Dec. 28, 1960

INVENTOR.
GERD KIPER
FRANZ JAKOB
ULRICH W. AUER
ROLAND KNORR
FRIDOLIN HENNIG

BY
Michael S. Striker
Attorney

INVENTOR.
GERD KIPER
FRANZ JAKOB
ULRICH W. AUER
ROLAND KNORR
FRIDOLIN HENNIG
BY
Michael S. Striker
Attorney

United States Patent Office 3,148,602

Patented Sept. 15, 1964

3,148,602

AUTOMATIC CAMERAS

Gerd Kiper and Franz Jakob, Unterhaching, near Munich, and Roland Knorr, Munich, Germany, Ulrich Wolfgang Auer, Geneva, Switzerland, and Fridolin Hennig, Munich, Germany, assignors to Agfa Aktiengesellschaft, Leverkusen-Bayerwerk, Germany Filed Dec. 28, 1960, Ser. No. 78,954
Claims priority, application Germany, Dec. 30, 1959, A 33,635
45 Claims. (Cl. 95—10)

The present invention relates to cameras.

More particularly, the present invention relates to cameras which are capable of automatically determining combinations of exposure time and exposure aperture which will provide proper exposures.

Most of the conventional cameras of this type provide only one series of combinations of exposure time and exposure aperture for different degrees of light intensity, and therefore the user of such cameras does not have the opportunity of selecting, for example, the smallest possible exposure aperture where the greatest depth of field is desired or the smallest possible exposure time where a photograph is being made of a rapidly moving object.

Where cameras are provided to enable the operator to make some choice in this respect, exceedingly complex structures result since different transmissions are provided depending upon whether the operator desires the smallest possible exposure time or the smallest possible exposure aperture, and as a result the cost of the camera is undesirably high and the size cannot be kept down to the desired extent. Moreover, with some cameras the operator presses a button to provide the desired type of operation, and this button forms one of a plurality of buttons capable of being selected for the purpose, and there is a great danger of depressing the wrong button particularly when the photographer concentrates on the subject.

One of the objects of the present invention is to provide a camera of the above type with a single transmission which is capable of being set to provide the desired type of operation of the camera.

Another object of the present invention is to provide a camera where the type of operation is preselected, before an exposure is made, and where irrespective of the type of operation the same structure is manipulated to make an exposure so that there is no possibility of the operator accidentally making the wrong choice by accidentally manipulating the wrong elements.

It is also an object of the present invention to provide a camera which not only will produce either the smallest exposure time or the smallest exposure aperture for the given lighting conditions, but which in addition, can also be set so as to provide the combination of exposure time and exposure aperture which will give some depth of field and some speed of exposure so that both of these factors may be taken into consideration simultaneously, if desired.

It is yet another object of the present invention to provide a camera of the above type which can also be set for manual operation so that, if desired, the camera need not be operated automatically.

It is still another object of the present invention to provide a camera of the above type which, when it is operated manually, is capable of providing exposure times longer than those which are available when the camera is operating automatically.

The object of the present invention also includes the provision of structure capable of accomplishing all of the above objects while at the same time being simple, compact, and reliable in operation, and also providing an extremely convenient, quick operation of all of the structure by the operator.

With the above objects in view, the present invention includes, in a camera which is capable of automatically determining combinations of exposure time and exposure aperture which will provide proper exposures, a support means and an exposure time setting means and an exposure aperture setting means carried by the support means. An operating means cooperates with both of these setting means for operating the latter to provide one of a plurality of different types of operation. A manually operable selecting means cooperates with the operating means for actuating the latter to provide selected type of operation, and the manually operable setting means is also capable of actuating the operating means to place the latter in a position where it frees the exposure time setting means and the exposure aperture setting means for manual operation, so that, if desired, the camera may be operated manually.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
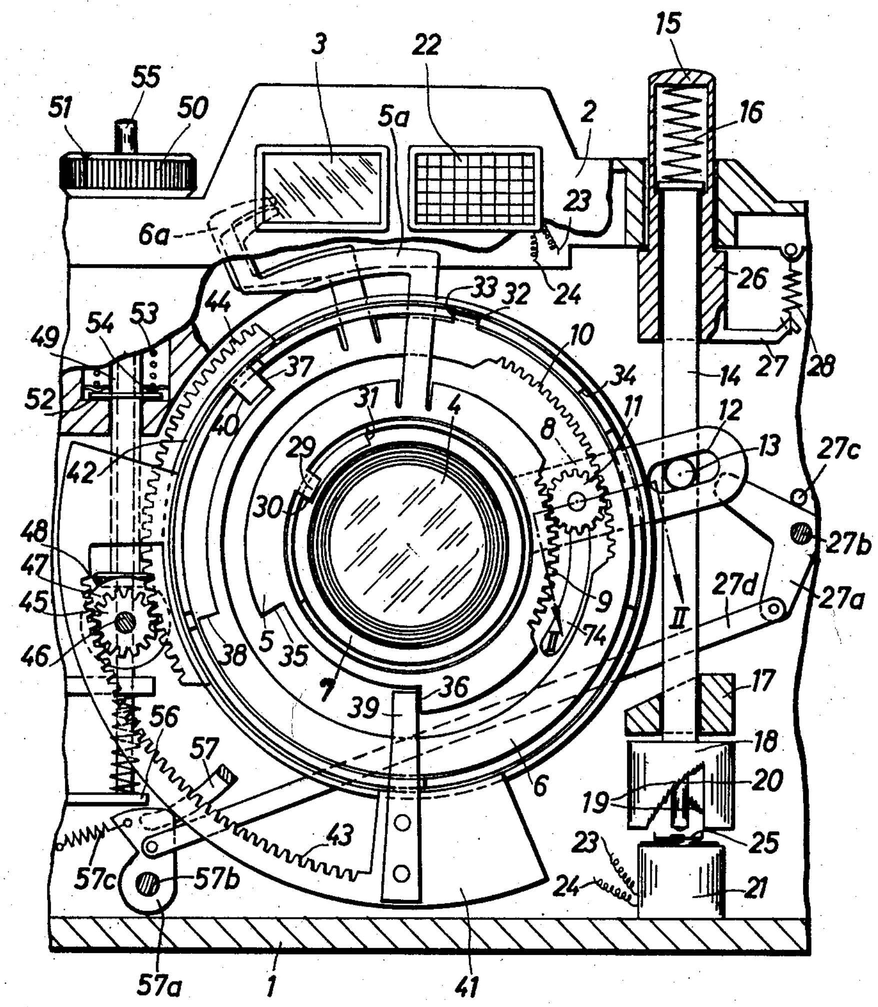
FIG. 1 is a fragmentary front elevation of one embodiment of a camera according to the present invention, the wall of the camera being broken away in FIG. 1 so as to show the structure behind this wall.

Referring now to FIG. 1, there is shown therein a camera which includes a camera housing 1 having an upper housing portion 2 within which are housed such components of the camera as, for example, the viewfinder 3. The housing 1 carries the objective 4, and the objective 4 includes an inner lens-carrying tube 7 which is surrounded by a diaphragm-setting ring 5 and an exposure time setting ring 6, these rings 5 and 6 respectively forming an exposure aperture setting means and an exposure time setting means carried by the support means which is formed in part by the tube 7 which is surrounded by and supports the ring 5 for rotary movement. The assembly includes an outer tube which is stationary and coaxially surrounds the tube 7, and the inner surface of this outer tube supports the ring 6 for rotary movement. The rings 5 and 6 are turnable about the optical axis which coincides with the axis of these rings, and furthermore the rings 5 and 6 are located in a common plane. The ring 5 actuates the diaphragm while the ring 6 adjusts the exposure time in a well-known manner not forming part of the present invention.

The ring 5 is provided at a portion of its outer periphery with teeth 9, while the ring 6 is provided at a portion of its inner periphery with teeth 10 identical with teeth 9, and it will be noted that the teeth 10 are spaced from and directed toward the teeth 9, the rings 5 and 6 being spaced from each other so that within this space there may be located the pinion 11 which meshes with the teeth 9 and 10 as shown in FIG. 1. Thus, the elements 9–11 form an operating means for operating the exposure time setting means 6 and the exposure aperture setting means 5, and in the illustrated example this operating means takes the form of a differential drive.

The pinion 11 is supported for free rotary movement on a pin which extends parallel to the optical axis and which is fixedly carried by a lever 8 which extends from a sleeve which surrounds and is turnable on the tube 7. Thus, referring to FIG. 2, it will be seen that the lever 8 is integral with and extends radially from a sleeve 58 which surrounds the tube 7. The outer free end of the lever 8 is formed with a longitudinal slot 12 into which a pin 13 extends, and this pin 13 is fixed to and extends from a vertical shaft 14 the upper end of which extends slidably into a hollow cap 15 which is accessible to the operator for manual actuation. Within the hollow cap 15 is located a spring 16 which urges the cap 15 upwardly until an upwardly directed shoulder in the interior of the cap 15 engages the enlarged upper end of the shaft 14, as illustrated in FIG. 1. The shaft 14 is guided for vertical movement by the stationary bearing 17 located in the interior of the camera housing 1, and the cap 15 is guided for vertical movement through a bore formed in the upper portion 2 of the camera.

At its lower end, the shaft 14 carries a hollow cylindrical scanning member 18 provided with a pair of opposed toothed portions 19 each extending substantially along a helix, as illustrated in FIG. 1, and within the cylindrical scanning member 18 is located a spring pressed pin 20 urged downwardly by a suitable spring to the end position shown in FIG. 1, with respect to the shaft 14, so that this pin 20 can yieldably move upwardly into the shaft 14 in a suitable bore thereof. Beneath the cylindrical scanning member 18, coaxially therewith, is located a stationary housing 21 which houses an electrical instrument such as a galvanometer which forms part of the structure for measuring the light intensity, this structure also including the photocell 22 carried by the upper housing portion 2 and electrically connected with the galvanometer by the electrical leads 23 and 24. The galvanometer includes a pointer 25 which is in the form of an elongated horizontal member connected at its center to the shaft of the rotor of the galvanometer and this pointer 25 has a turning axis which coincides with the axis of the shaft 14. Thus, the angular position of the pointer 25 will be indicative of the light intensity. The hollow cap member 15 is integral with a lower sleeve portion 26 through which the shaft 14 slidably extends, and this sleeve portion fixedly carries an arm 27 to the outer end of which a spring 28 is connected, the upper end of this spring being fixed to the upper portion of the camera housing so that the spring 28 urges the sleeve 26 up to the illustrated rest position in FIG. 1 and thus acts to return their parts to their rest position.

In order to limit the extent of turning of the ring 5, this ring has at its inner periphery an inwardly directed projection 29 extending into an arcuate cutout formed in the wall of the tube 7, and this arcuate cutout is limited at its ends by the end faces 31 and 30, so that the projection 29 can only turn between these end faces and thus limits the extent of turning of the ring 5. In the same way the exposure time setting ring 6 has a projection 32 extending from its outer periphery into the space between a pair of stop surfaces 33 and 34, the outer tube in which the ring 6 is slidably supported being formed with a slot whose ends form the stop surfaces 33 and 34 and in which the projection 32 extends. In this way the movement of the elements 5 and 6 is limted between predetermined end positions, and of course at these end positions the ring 5 will provide the largest and smallest exposure apertures while the ring 6 will provide the longest and shortest exposure times.

Furthermore, it will be seen that the ring 5 itself is formed at its outer periphery with an arcuate notch providing end stop surfaces 35 and 36, while the ring 6 is provided at its outer periphery with an arcuate notch providing the end stop surfaces 37 and 38, and a projection 39 is located between the stops 35 and 36 while a projection 40 is located between the stops 37 and 38. These projections 39 and 40 form part of a manually operable structure which is capable of being manipulated by the operator for the purpose of selecting the type of operation to be provided by the camera. Thus, the projection 39 is fixedly carried by a selecting member 41 while the projection 40 is fixedly carried by a selecting member 42, and these selecting members are in the form of arcuate elements which respectively extend along circles whose centers are in the optical axis. The selecting members 41 and 42 are supported for rotary movement about the optical axis and the selecting member 41 is provided with inner teeth 43 while the selector 42 is provided with outer teeth 44, and a pinion 45 is located between and meshes with the teeth 43 and 44, so that here also in the manually operable selecting structure there is a differential transmission. The pinion 45 is fixedly carried by a pin 46 which is supported for rotary movement in stationary bearings carried by the camera and not shown for the sake of clarity, this pin 46 extending parallel to the optical axis. This pin 46 fixedly carries a bevel gear 47 which meshes with a second bevel gear 48 which is fixed coaxially to a hollow shaft 49 which extends parallel to the shaft 14. The shaft 49 extends through the upper part of the camera housing to the exterior thereof and carries at the exterior of the housing a knob 50 which is accessible to the operator, this knob being fixed to the shaft 49 so that the operator can manually turn the shaft 49 about its axis. Of course, such manually turning of the knob 50 will result in turning of the shaft 49 and thus in turning of the gears 48 and 47 so as to turn the pinion 45 and thus act on the selector members 41 and 42, and since the axis of the pinion 45 is maintained stationary it is clear that the selectors 41 and 42 will at all times move in equal and opposite directions. The knob 50 of the manual selecting means carries a mark 51 which forms an index adapted to cooperate with indicia arranged on the upper surface of the camera around the knob 50, and this indicia may include, for example, a pair of marks such as arrows or the like with which the index 51 may be aligned. These marks or arrows will show the direction in which the knob 50 should be turned in order to select a combination of exposure time and exposure aperture which will provide the greatest depth of field or the shortest possible exposure time to make clear photographs of rapidly moving subjects.

Fixed to the shaft 49 is a brake disc 52 against which a brake ring 54 is urged by a spring 53 coiled around the shaft 49, having its bottom end in engagement with the ring 54, and having its upper end in engagement with a wall of the camera. This brake means 52, 54 will act through the shaft 49 on the bevel gears 47 and 48 and thus on the pinion 45 to act through the latter on the selecting members 41 and 42. In the interior of the tubular, hollow shaft 49 is located an elongated rod 55 which is axially shiftable through the tubular member 49 and which has an upper free end accessible to the operator, this rod 55 being depressed by the operator for the purpose of releasing the shutter so as to make an exposure. The lower end of the rod 55 is fixed to an arm 56 which is adapted to actuate the shutter release lever 57 in a well-known manner. It will be noted that in the rest position of the apparatus the downward movement of the arm 56 into engagement with the lever 57 is blocked by a blocking member 57*a* urged to the position illustrated in FIG. 1 by a spring 57*c*, this blocking member 57*a* being supported for turning movement about an axis parallel to the optical axis by a stationary pin 57*b*. An elongated link 27*d* is pivotally connected at its lower left end, as viewed in FIG. 1, to the blocking member 57*a* and at its upper right end to the lower arm of the bell crank 27*a* which is supported for turning movement by the stationary pin 27*b*, the upper arm of the bell crank 27*a* being located in the path of downward movement of the arm 27. A stop pin 27*c* is engaged by the bell crank 27*a* in the position of the parts shown in FIG. 1 so as to limit the turning of the elements by the spring 57*c*, and thus in the illustrated position the blocking member 57*a* is located in the position where it blocks the downward movement of the arm 56 and thus the shutter cannot be released to make an exposure with the parts in the position of FIG. 1. It is only when the shaft 14 and the hollow cap 15 have been moved downwardly through a distance sufficient to have actuated all of the structure to the exposure time and exposure aperture to a combination which will make a proper exposure that the arm 27 reaches the bell crank 27*a* to turn the latter so as to act through the link 27*d* on the blocking member 57*a* to turn the latter in a clockwise direction, as viewed in FIG. 1, to a position out of the path of downward movement of the arm 56 so that at this time the lever 57 can be actuated when the operator depresses the rod 55 in order to make an exposure.

Figure 2:
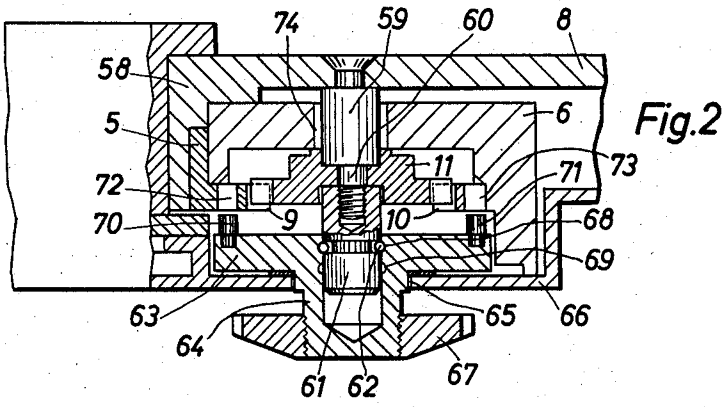
FIG. 2 is a fragmentary sectional view, taken on an enlarged scale, along line II—II of FIG. 1 in the direction of the arrows.

As is apparent from FIG. 2, the shaft which turnably supports the pinion 11 includes three portions 59, 60 and 61, and this shaft extends through an elongated arcuate slot 74 formed in the exposure time setting ring 6. The pinion 11 is freely turnable on the intermediate portion 60 of the shaft, and the end faces of the portions 59 and 61 which are of a larger diameter than the portion 60 respectively engage the opposed faces of the pinion 11 to restrain the latter against axial movement. The portion 61 is formed with an annular exterior groove in which the springy split ring 62 is located. The shaft portion 61 also extends into an axial bore of a plate 63 which is integral with a sleeve 64 into which the shaft portion 61 slidably extends. The sleeve 64 extends through an arcuate slot 65 which extends along a circle whose center is in the optical axis and which is formed in the front wall 66 of the camera housing. At the exterior of the camera the sleeve 64 is fixed with a manually engageable knob 67 so that the operator may engage this knob for the purpose of axially shifting the sleeve 64 and the plate 63. This plate 63 is shiftable between two positions in which the split ring 62 is located in the annular grooves 68 and 69 formed in the interior of the axial bore of the plate 63 so that in this way this plate together with the sleeve 64 and the knob 67 may be releasably maintained in either of these axial positions.

In the position of the parts illustrated in FIG. 2 the pinion 11 is freely turnable with respect to the rings 5 and 6, and in this position the split ring 62 is located in the groove 68. When this sleeve 64 is shifted inwardly so as to locate the split ring 62 in the groove 69, a pair of pins 70 and 71 which are fixedly connected with the plate 63 enter into a pair of openings 72 and 73, respectively, formed in the rings 5 and 6 so that in this way these rings 5 and 6 are locked to each other when the plate 63 is shifted inwardly, and the parts have a predetermined rest position where, for example, the largest exposure aperture and the longest exposure time are provided, and in this rest position the pins 70 and 71 are aligned with the openings 72 and 73 so that the operator may shift the manually operable member 64 inwardly to its locking positon locking the rings 5 and 6 against rotary movement one with respect to the other so that these rings must now turn together. Thus in this position of the parts the differential drive will be locked against operation.

In order to make an exposure with the above-described structure the operator first makes a selection according to whether the subject to be photographed is such that the greatest depth of field is desired or whether the subject is rapidly moving so that the smallest exposure time is desired. In accordance with the particular selection made the operator will turn the knob 50 until its index 51 is aligned with one of a pair of marks which indicate that the structure is set to provide the desired type of operation.

The parts are shown in FIG. 1 in their rest position where the rings 5 and 6 will provide the largest exposure aperture and the longest exposure time, as indicated above, and this particular exposure time is the longest exposure time which can be provided without the risk of the operator providing a blurred photograph as a result of unsteady holding of the camera. Once the knob 50 has been turned so as to select the type of operation then the operator will depress the hollow cap 15, and because of its stiffness the spring 16 will not at first be compressed and will instead maintain its length and will transmit the downward movement of the cap 15 to the shaft 14 which will move downwardly with the element 15. The shaft 14 will move downwardly and the spring-pressed pin 20 will engage the pointer 25 so as to stop the turning movement thereof and thus the spring press pin 20 forms a brake means cooperating with the galvanometer pointer to stop the latter when it is being scanned by the scanning member 18. The downward movement continues until the teeth of the pair of portions 19 engage the pointer, and because the teeth 19 are located along a pair of helixes the elevation of the scanning member 18 will be determined by the angular position of the pointer 25 and thus the extent to which the shaft 14 will be moved downwardly will be indicative of the light intensity. During the downward movement of the shaft 14, the pin 13 fixed thereto turns the lever 8 and thus turns the pinion 11 around the opitcal axis. It will be noted that in the position of the parts shown in FIG. 1 any tendency of the pinion 11 to act through the teeth 9 on the ring 5 so as to turn the latter in a clockwise direction will be opposed by engagement of the stop surface 36 with the projection 39 of the selecting member 41. On the other hand, during the clockwise turning of the pinion 11 around the optical axis with the lever 8 the teeth of the pinion 11 can cooperate with the teeth 10 to turn the ring 6 in a clockwise direction since the projection 40 engages the surface 37 and this latter surface can therefore turn freely in a clockwise direction away from the projection 40. Thus, in the illustrated position of the parts the ring 6 will turn while the ring 5 remains stationary. This ring 5 remains stationary because the brake means 52, 54 acts through the train of elements 45, 47, 48 to oppose the turning of the selector 41. Therefore, the position of the parts shown in FIG. 1 will provide an arrangement where the exposure aperture will remain at its maximum value while the exposure time continuously decreases during the downward movement of the shaft 14, and it is thus clear that the knob 50 is in that position which will provide the shortest possible exposure time and hence in that position where the best possible photograph will be made of a rapidly moving object. Thus, at least during the initial part of the downward movement of the shaft 14 with the elements in the position illustrated in FIG. 1 the pinion 11 will ride on the stationary teeth 9 and will act on the teeth 10 to turn the exposure time setting ring 6 which will of course at this time turn through twice the angle that the lever 8 turns through.

It will be noted that while the ring 6 thus turns in a clockwise direction, as viewed in FIG. 1, the projection 32 thereof moves away from the stop 33 toward the stop 34. In the event that a relatively small amount of light is available, the scanning member 18 will engage the pointer 25 before the projection 32 engages the stop surface 34, and thus the downward movement of the shaft 14 and the turning of the ring 6 will terminate at a point where the combination of exposure time and exposure aperture will be that which includes the largest exposure aperture with the smallest possible exposure time. The continued downward movement of the element 15 at this time will result in compression of the spring 16 and the arm 27 will now approach and engage the bell-crank 27*a* so as to move the blocking member 57*a* away from beneath the arm 56, and with the element 15 fully depressed the operator can depress the rod 55 so as to make the exposure. Upon release of the parts the spring 28 will return the rod 14 and all the elements connected thereto including the pinion 11 and the ring 6 to their starting position shown in FIG. 1, and a spring connected to the arm 56 will return the latter and the rod 55 to their starting position while the spring 57*c* will act in the manner described above to locate the bellcrank 27*a* against the stop member 27*c*. Of course, as soon as the scanning member 18 moves upwardly the pointer 25 will be released to turn to whatever position it takes as a result of the light received by the photocell 22.

In the event that there is so much light available that when the smallest exposure time has been provided it is also necessary to reduce the size of the exposure aperture in order to make the proper exposure, then after the projection 32 engages the stop 34, the shaft 14 will continue to move downwardly since the pointer 25 will now be in a position where the teeth 19 have not yet engaged the pointer, and during this continued downward movement since the projection 32 engages the stop 34 the ring 6 cannot be turned further and the smallest possible exposure time is set into the camera. The continued downward movement of the shaft 14 at this time will result, however, in continued turning of the lever 8 and continued turning of the pinion 11 around the optical axis, but now the pinion 11 will ride on the teeth 10 and will act through the teeth 9 on the ring 5 to turn the latter, the ring 5 at this time displacing the projection 39 and the selecting member 41 in opposition to the force of the brake means 52, 53. Thus, at this time the ring 5 turns at twice the angle through which the lever 8 turns, and the projection 29 moves away from the stop 30 toward the stop 31. Thus, where a relatively large amount of light is available the structure of the camera will continue to operate beyond the smallest exposure time in the above example so as to reduce the exposure aperture. As is apparent from FIG. 1 a pair of indicators 5*a* and 6*a* are respectively fixed to and extend from the rings 5 and 6 through suitable slots in the tubular members and these indicators have upper ends which will turn into the field of the viewfinder 3 so as to be visible to the operator. In the above-described example the indicator 6*a* will first move in advance of the indicator 5*a* and by identifying these indicators with different colors, for example, the operator will know while looking through the viewfinder that the camera has been set so as to make the best possible photograph for a rapidly moving object or for obtaining the greatest depth of field.

The angular length of the distance between the stop surfaces 35 and 36, on the one hand, and the stop surfaces 37 and 38, on the other hand, is equal at least to the sum of the angular distances between the stop surfaces 33 and 34, on the one hand, and the stop surfaces 30 and 31, on the other hand, so that in the above-described example, for example, the stop surface 38 will not engage the projection 40 until the projection 29 has engaged the stop surface 31, and thus it is possible for both of the rings 5 and 6 to move through their entire range of movement to the position providing the smallest exposure time and the smallest exposure aperture.

Of course, after a certain selection has been made with the knob 50, it is always possible for the operator to change the selection by turning the knob 50, and this is true even after the operator has started to depress the element 15, and the turning of the knob 50 will simply result in equal and opposite turning of the selector members 41 and 42 which through their projection 39 and 40, respectively, will turn the rings 5 and 6, if necessary.

Of course, the example described above is one where the ring 6 moves in advance of the ring 5 so as to provide the smallest possible exposure time with the largest exposure aperture, and in the event that it is desired to take a photograph with the largest possible depth of field the element 50 is turned so as to locate the projection 40 in engagement with the surface 38 and the projection 39 in engagement with the surface 35. Now when the operator depresses the cap 15 it will be seen that the stop 38 engages the projection 40 so that the ring 6 cannot turn while the surface 35 of the ring 5 is of course free to move away from the projection 39 and thus it is the exposure aperture which will first be diminished in size under these conditions.

In the event that it is desired to make an exposure where in addition to a certain amount of depth of field there is also a moving subject requiring a relatively short exposure time, then the operator presses the knob 67 of FIG. 2 inwardly so as to locate the pins 70 and 71 respectively in the openings 71 and 73 and thus lock the differential against operation as described above. Thus the rings 5 and 6 cannot turn one with respect to the other or with respect to the lever 8. Now when the operator depresses the cap 15 the pin 13 of the shaft 14 will again turn the lever 8, until the scanning member 18 engages the pointer 25 so as to limit the downward movement of the shaft 14. As a result of the lock differential drive both of the setting means 5 and 6 are turned through the same angle as the lever 8 so that the size of the exposure aperture as well as the length of the exposure time are simultaneously reduced and the depth of field is increasing while the exposure time is decreasing so that it becomes possible to take the photograph of a moving object with a substantial depth of field. After the exposure the parts are returned to their starting position in the manner described above, and of course the operator will shift the plate 63 to the position shown in FIG. 2 in the event that the next exposure is one where the operator does not desire the exposure time and exposure aperture to be reduced simultaneously.

Figure 3:
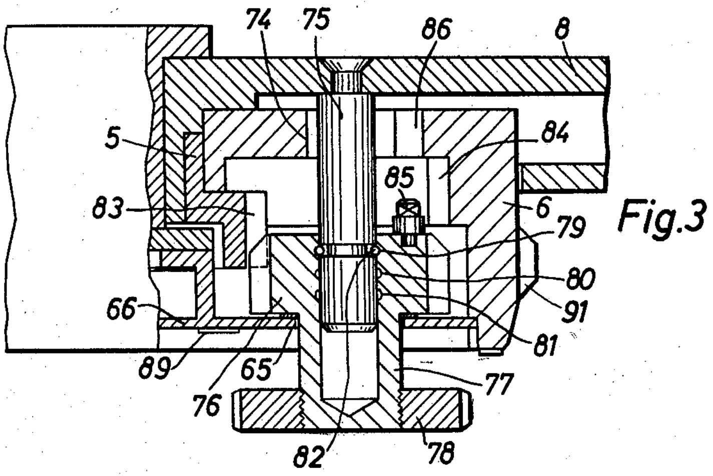
FIG. 3 is a sectional view of another embodiment of the structure of FIG. 2.

According to the embodiment which is shown in FIG. 3 there is also a pin 75 fixed to the lever 8 for turning movement therewith, this pin 75 extending through the arcuate slot 74 of the ring 6. A pinion 76 is freely turnable on the shaft 75 and is connected by a coaxial sleeve 77, which extends through the arcuate slot 65 formed in the front plate 66 of the camera, with the knob 78 which is accessible to the operator so that the operator may axially shift the pinion 76 along the shaft 75. In the interior of the bore of the pinion 76 the latter is formed with three annular grooves 79, 80, and 81 which are adapted to cooperate with the split ring 82 located in an annular groove formed in the shaft 75, as shown in FIG. 3, so that in this way it is possible to releasably locate the pinion 76 with the detent means formed by the spring 82 in a selected one of three axial positions. The teeth of the pinion 76 are longer than the teeth of the pinion 11, and in the illustrated position shown in FIG. 3 these teeth of the pinion 76 mesh with the teeth 83 of the ring 5, these teeth 83 having an axial length which also is longer than that of the teeth 9. Also, it will be noted that in the position of the parts shown in FIG. 3 the teeth of the pinion 76 are located beyond the teeth 84 of the ring 6. Thus, in the position of the parts shown in FIG. 3 there is no connection between the pinion 76 and the ring 6.

If the pinion is shifted inwardly to its intermediate position where the split ring 82 enters the groove 80, then the pinion meshes simultaneously with the teeth 83 and 84 so that it meshes simultaneously with the rings 5 and 6. In its innermost, third position the pinion remains in mesh with the teeth 83 and 84, but in addition a pin 85 which is fixed to the pinion enters into a cutout 86 formed in the ring 6, this cutout 86 being in the form of a recess located along one surface of the slot 74 and having a curvature corresponding to that of the cylindrical member 85 so that in this innermost position the element 85 will serve to lock the rings 5 and 6 against turning movement one with respect to the other as well as with respect to the lever 8.

Figure 4:
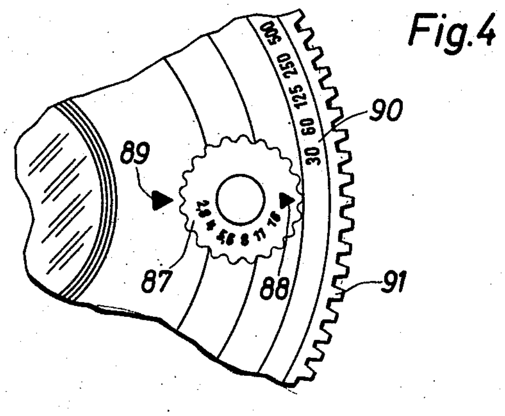
FIG. 4 shows part of the structure of FIG. 3 as it appears from the front of the camera on a smaller scale than that of FIG. 3.

As is apparent from FIG. 4, the knob 78 carries at its exterior a scale 87 of stop numbers indicating the different aperture settings as well as an index 88. The scale 87 cooperates with an index 89 located on the front plate 66, while the index 88 cooperates with a scale 90 of exposure times located on the front rim of the ring 6, this rim extending beyond the front plate 66 to the exterior so as to be visible, as is apparent from FIGS. 3 and 4. Furthermore, it will be noted that the exterior surface of the ring 6 is provided with a knurled portion 91 adapted to be engaged by the operator.

With the embodiment of FIGS. 3 and 4, when the split ring 82 is in the groove 80, the structure will operate in the manner described above in connection with FIGS. 1 and 2, the embodiment which includes the structure of FIGS. 3 and 4 including all of the structure of FIG. 1 with the exception of the structure shown in FIGS. 3 and 4. Thus, when the pinion 76 is located in its intermediate position all of the operations described above in connection with FIGS. 1 and 2 can be carried out, and of course when the pinion 76 is shifted to its innermost position where the lock member 85 is in the cutout 86 the structure is locked in the same way as when the pins 70 and 71 are in the openings 72 and 73, respectively. Thus, when the ring 82 is in the groove 81 the differential drive is locked against operation and the rings 5 and 6 will turn together with the lever 8.

The embodiment of FIG. 3 provides, however, the additional possibility of manipulating the knob 78 so as to manually set the exposure aperture when the split ring 82 is in groove 79, and at this time the scale 87 will cooperate with the index 89. Furthermore, it is also possible when the knob 78 has the angular position shown in FIG. 4 to manually turn the ring 6 by engaging the knurled portion 91 thereof so as to manually set the exposure time by alignment of a graduation of the scale 90 with the index 88. Thus, with the embodiment of FIGS. 3 and 4 it is possible to provide manual setting of the exposure time and exposure aperture. As is apparent from FIG. 4, once the exposure time has been set the operator can turn the knob 78 so as to provide a selected exposure aperture, and at this time it will make no difference that the index 88 moves away from the scale 90 since the exposure time will have already been set.

Figure 5:
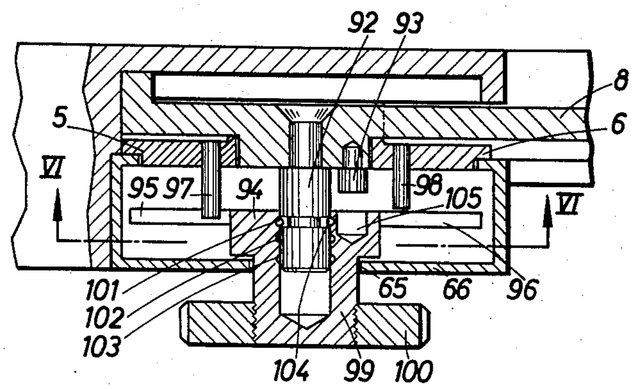
FIG. 5 is a sectional view of yet another embodiment of the structure of FIG. 2.
Figure 6:
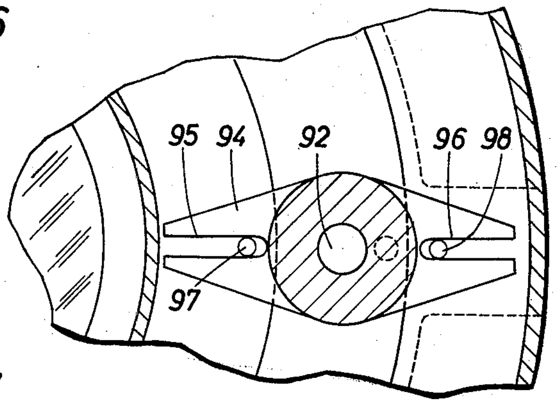
FIG. 6 is a fragmentary sectional view taken along line VI—VI of FIG. 5 in the direction of the arrows.

The embodiment of the invention which is shown in FIGS. 5 and 6 shows a structure which can accomplish the results described above in connection with FIG. 3, the difference being that in the embodiment of FIGS. 5 and 6 the differential drive is formed with a lever arrangement rather than with a gear arrangement. Thus, with the embodiment of FIGS. 5 and 6 the lever 8 fixedly carries a shaft 92 as well as a lock pin 93. On the shaft 92 a control lever 94 is axially shiftable and angularly turnable. In this lever 94 there are formed a pair of radial slots 95 and 96 (FIG. 6) in which a pair of pins 97 and 98 are adapted to respectively extend, these pins being respectively fixed to the rings 5 and 6, as indicated in FIGS. 5 and 6. The pins 97 and 98 extend parallel to the optical axis and it is apparent that these pins cooperate with the lever 94 to provide a differential transmission. The lever 94 is fixed with a sleeve 99 slidable along the shaft 92 and extending through the arcuate slot 65 formed in the front plate of the camera, and at the exterior of the camera this sleeve 99 is fixed to the knob 100.

The interior of the sleeve 99 is formed with the annular grooves 101, 102 and 103 adapted to selectively receive the split ring 104 located in an annular groove formed in the shaft 92 so that in this way the lever 94 can be shifted axially to a selected one of three positions. Moreover the lever 94 is formed with a bore 105 adapted to receive the lock pin 93.

It will be noted that the pins 97 and 98 are of different lengths, and in the position of the parts shown in FIG. 5 the lever 94 is operatively connected only with the pin 97 so that in this position the knob 100 can be turned for manually setting the exposure aperture. If the lever 94 is shifted to its intermediate position where this spring 104 is located in the groove 102, then the lever is operatively connected with both of the pins 97 and 98 and thus at this time the differential drive is operative to provide turning of the rings 5 and 6 in the manner described above in connection with FIGS. 1 and 2, the structure of FIGS. 5 and 6 also being incorporated into the structure shown in FIGS. 1 and 2 and only the structure of FIG. 2 being changed for that shown in FIGS. 5 and 6. In the innermost position of the lever 94 the recess 105 receives the lock pin 93 and of course the groove 103 receives the split ring 104, and while the pins 97 and 98 still respectively extend through the slots 95 and 96 the differential drive is locked since the lever 94 cannot turn with respect to the lever 8 about the shaft 92, and thus in this position the rings 5 and 6 will turn together with the lever 8. Of course, if desired, with the embodiment of FIG. 5 a lever or the like may extend from the ring 6 to the exterior so as to be accessible to the operator for manual setting of the exposure time when the parts are in the position of FIG. 5, the knob 100 being turntable for setting the exposure aperture with the parts in the position of FIG. 5, as indicated above.

Figure 7:
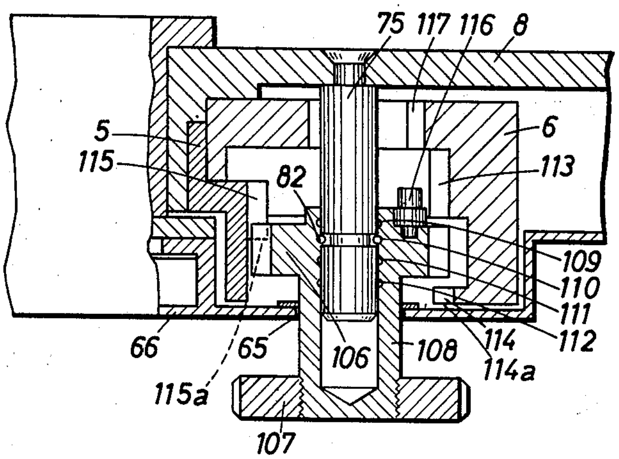
FIG. 7 is a sectional view of yet another embodiment of the structure of FIG. 2.

FIG. 7 shows an embodiment where in contrast to that of FIG. 3 the rings 5 and 6 may be separately turned by manual engagement of the same adjusting element. Thus, referring to FIG. 7 it will be seen that the lever 8 fixedly carries the shaft 75 which extends parallel to the optical axis, and on this shaft 75 is located the pinion 106 which is turnable on the shaft 75 as well as axially shiftable therealong. The pinion 106 is coaxially fixed with a sleeve 108 which extends through the arcuate slot 65 formed in the front wall 66, and at its front end the sleeve 108 is fixed with the knob 107 as indicated in FIG. 7. The sleeve 108 is formed in its interior with four annular grooves 109, 110, 111, and 112, and the shaft 75 has in its annular groove the spring split ring 82 adapted to be selectively located in one of these four grooves in the interior of the sleeve 108, so that in this way it is possible by manipulation of the knob 107 to locate the pinion 106 in a selected one of four axial positions. In the embodiment of FIG. 7 the exposure time setting ring 6 is provided in its interior with two sets of axially displaced inner teeth 113 and 114 which are axially displaced one with respect to the other by an axial distance which is greater than the axial length or thickness of the pinion 106, as is apparent from FIG. 7. The exposure aperture adjusting ring 5 is provided with exterior teeth 115 which are axially offset with respect to the teeth 113 and 114 in such a way that the axial distance between the end 115*a* of the teeth 115 and the end 114*a* of the teeth 114 is also greater than the axial length or thickness of the pinion 106. The pinion 106 fixedly carries a lock pin 116 adapted to enter into a cutout 117 of the ring 6, these parts cooperating in the same way as the pin 85 and the cutout 86 of FIG. 3. When the knob 107 has been pulled forwardly by a distance sufficient to locate the split ring 82 in the groove 109, then the pinion 106 will mesh only with teeth 114, so that at this time the exposure time may be manually set by manual turning of the ring 6. If the operator shifts the pinion 106 inwardly until the split ring 82 is located in the groove 110, as illustrated in FIG. 7, then the pinion 106 meshes only with the teeth 115 and thus in this position the diaphragm may be manually adjusted. Upon further axial shifting of the pinion 106 so as to locate the split ring 82 in the groove 111, the pinion 106 simultaneously meshes with the teeth 115 and the teeth 113 so that at this time the differential drive has been placed by the manually operable means 107, 108 in the operating position where the drive is operative to operate the rings 5 and 6 in the manner described above in connection with FIG. 1, and thus it is possible to make a preselection with the knob 50 of the type of operation which is desired as described above.

Upon moving the knob 107 inwardly to its innermost position where the split ring 82 is located in the groove 112, the lock pin 116 enters into the cutout 117 so that the rings 5 and 6 are locked to each other as well as to the lever 8 and are constrained to turn with the latter to provide the same type of operation as was described above in connection with FIG. 2 when the pins 70 and 71 are respectively in the openings 72 and 73.

Figure 8:
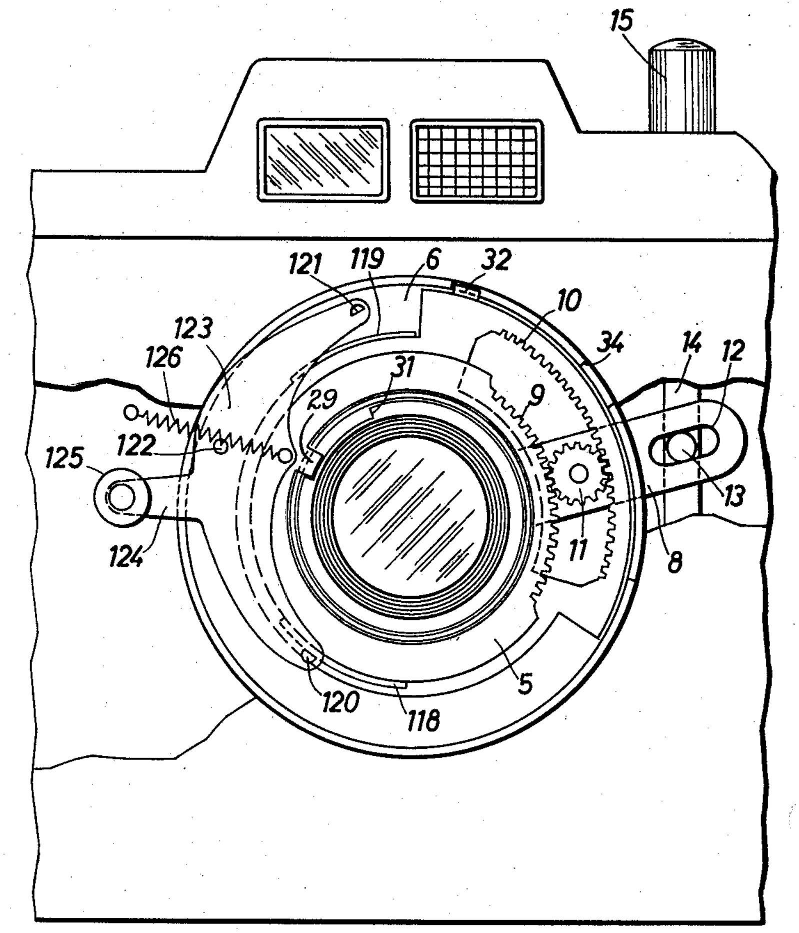
FIG. 8 is a front view of another embodiment of the structure of FIG. 1.

The embodiment of the invention which is illustrated in FIG. 8 differs from that of FIG. 1 essentially in that the preselecting structure for selecting the type of operation is replaced by a simple brake assembly. In this embodiment the outer periphery of the ring 5 carries a layer of brake lining material 118, and the outer periphery of the ring 6 is provided with a layer 119 of the same material. The brake linings 118 and 119 respectively cooperate with brake pins 120 and 121, and these pins are respectively fixed to the ends of a two armed arcuate lever 123 which forms a selecting lever and which is turnably supported by a stationary pivot pin 122. The lever 123 has an extension 124 connected with a manually engageable knob 125 which is accessible to the operator so that the operator may manipulate the selecting lever 123 to provide the desired type of operation. The knob 125 is accessible at the front of the camera and extends, for example, through an arcuate slot formed in the front wall of the camera and having its center of curvature in the axis of the pivot pin 122. An elongated coil spring 126 is fixed at its right end, as viewed in FIG. 8, to the lever 123 and at its left end to a stationary pin, and the arrangement is such that in the position shown in FIG. 8 a straight line extending between the ends of the spring 126 will pass above the axis of the pin 122 while when the lever 123 is turned in a clockwise direction from the position shown in FIG. 8 so as to cause the pin 121 to approach the lining 119, a straight line drawn through the ends of the spring 126 will pass below the axis of the pin 122, and thus the spring 126 forms a snapover center spring which serves to maintain the lever 123 yieldably either in the position shown in FIG. 8 where the pin 120 engages the lining 118 or in the other position where the pin 121 engages the lining 119.

With the embodiment of FIG. 8 the exposure aperture setting ring 5 and the exposure time setting ring 6 are interconnected by a differential drive 9–11 in the same way as described above in connection with FIG. 1, and of course the pinion 11 is carried by the lever 8 turnable about the optical axis and moved downwardly by the same structure which was described above in connection with FIG. 1. It will be noted that the ring 6 also has a projection 32 movable between the stops 33 and 34 while the ring 5 has also the projection 29 movable between the stops 30 and 31, all as described above in connection with FIG. 1. Thus, with the embodiment of FIG. 8 and the parts in the position illustrated the brake means acts to prevent turning of the exposure aperture setting ring 5 at least during the initial part of the downward movement of the lever 8, and thus the ring 6 will turn until its projection 32 engages the stop 34. The pressure with which the spring 126 urges the pin 120 against the lining 118 is such that if the lighting conditions call for further downward movement of the lever 8 beyond the angle through which it has turned to place the projection 32 in engagement with the stop 34, then the force acting on the lever 8 through the shaft 14 would be sufficient to overcome the frictional resistance between the pin 120 and the lining 118 and the ring 5 will thus turn at this time so that its inner projection will approach the stop 31. On the other hand, it is possible for the operator to turn the lever 123 in a clockwise direction to place the pin 121 in engagement with the lining 119, and at this time during the initial downward movement of the lever 8 it is the ring 5 which will turn while the ring 6 will be maintained stationary unless it is required that the lever 8 continue to turn after the projection of the ring 5 engages the stop 31 in which case the friction between the lining 119 and the pin 121 is such that the downward movement of the lever 8 will cause the lining 119 to slip with respect to the pin 121 and thus the ring 6 can turn to cause the projection 32 to approach the stop 34. Thus, with the simple brake means of FIG. 8 it is possible to provide a selection of a type of operation where the smallest possible exposure time is provided, and the parts are in this position in FIG. 8, or a type of operation where the smallest possible exposure aperture is provided, the pin 121 engaging the lining 119 for this purpose.

Of course, it is possible to incorporate into the embodiment of FIG. 8 the structure of FIG. 2 so that it is possible to block the differential drive and thus provide for simultaneous turning of the rings 5 and 6 with the lever 8.

Figure 16:
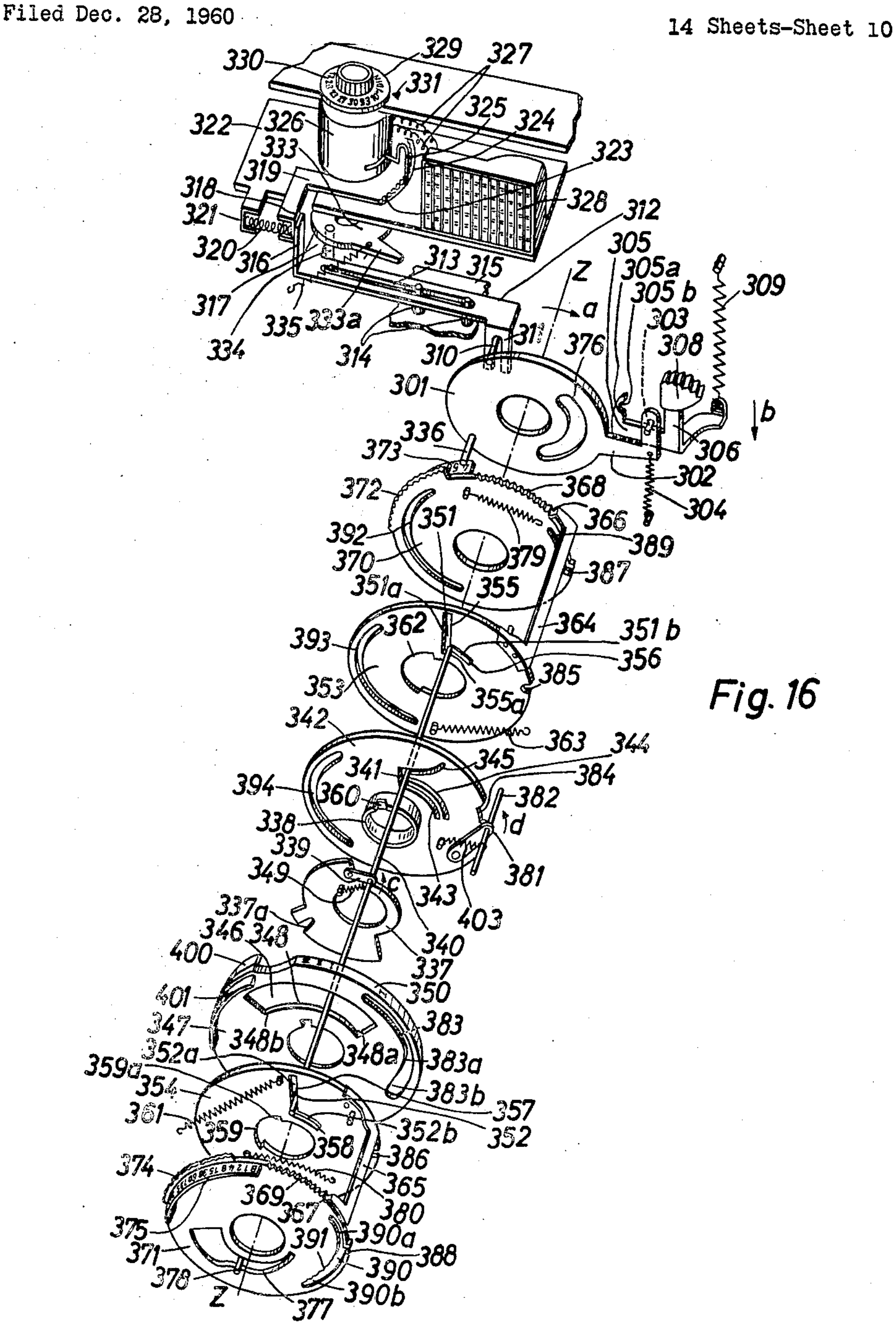
FIG. 16 is an exploded perspective illustration of a still further structure according to the present invention.

Referring now to FIGS. 9–12, the embodiment of the invention illustrated therein includes a ring 150 which is supported for rotary movement about the optical axis and which serves as part of a drive means for providing a drive to operate on the exposure time setting means and exposure aperture means of this embodiment. The ring 150 carries a pin 151 which engages an arm 149 of a manually operable structure corresponding to the structure operated by actuation of the cap 15 of FIG. 1 so that when this structure is manually actuated the arm 149 will move in the direction of the arrow *a* of FIG. 9. A drive spring 152 is connected at one end to a projection of the ring 150 and at its opposite end to a stationary pin of the camera so as to maintain the pin 151 in engagement with the arm 149. This arm 149 is under the influence of a spring similar to the spring 28 of FIG. 1 capable of returning the parts to their starting position illustrated in FIG. 9, and this spring which corresponds to the spring 28 is stronger than the spring 152 so as to maintain the ring 150 in its rest position where the spring 152 is tensioned. The ring 150 also carries a pin 153 which cooperates with a bifurcated portion 148 of a slide member which forms part of a scanning structure for engaging a pointer of a galvanometer operated by a photocell so as to determine the position to which the element 148 can be moved by the pin 153 in accordance with the lighting conditions. This scanning structure as well as the structure for manual downward movement of the arm 149 is well-known and therefore not illustrated in FIG. 9. However, a scanning structure which corresponds to that used with the embodiment of FIG. 9 as well as a manually operable structure corresponding to that used with the arm 149 is shown in FIG. 16 and is described below.

Figure 9:
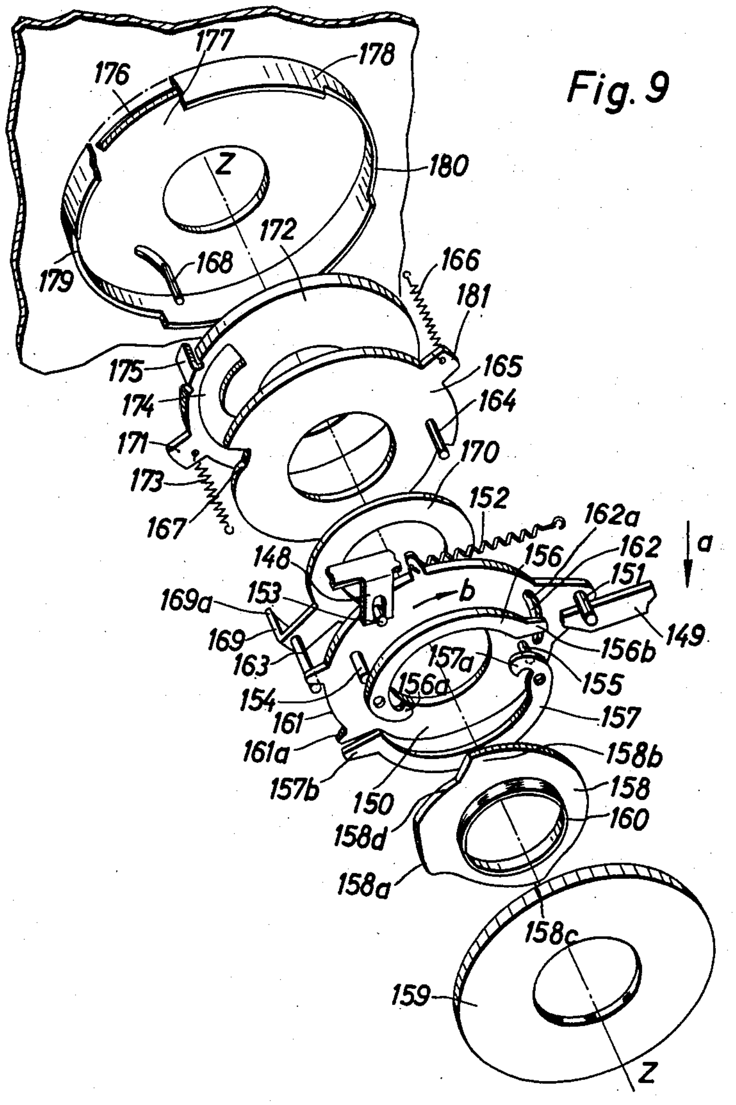
FIG. 9 is an exploded illustration of another type of structure according to the present invention.

The ring 150 of the operating means of FIG. 9 carries a pair of pins 154 and 155 which extend parallel to the optical axis and which serve to pivotally support a pair of motion transmitting members 156 and 157, respectively. Each of these motion transmitting members is in the form of a two-armed, approximately semi-circular lever. One end of each of these levers is provided with a cam follower portion 156*a*, 157*a*, and these cam follower portions cooperate with a cam 158 of a manually operable means for selecting the particular type of operation with the embodiment of FIG. 9. The cam 158 is fixedly carried by a tubular member 160 which is supported for rotary movement about the optical axis and which is fixed to a manually engageable member 159 accessible to the operator for turning the cam 158 to a position which will provide the selected type of operation, as described below. The outer free ends 156*b* and 157*b* of the motion transmitting members 156 and 157 cooperate with pins 163 and 164, respectively, to form with the latter means for transmitting the motion of the drive means 150, 152 to the exposure time setting means and exposure aperture setting means in a manner described below. The pin 164 is fixed directly to a ring 165 which forms part of the exposure time setting means and which is acted upon by a spring 166 one end of which is connected to the ring 165 and the other end of which is fixed to a stationary pin of the camera, and this ring 165 is provided with a camming edge 167 which is engaged by a pin 168 of a known exposure time setting structure. The pin 163 is fixed to the angular arm 169 of a ring 170 which is turnable about the optical axis and the free end 169*a* of the arm 169 extends parallel to the optical axis and engages the projection 171 of the diaphragm setting ring 172 which is urged by the spring 173 to a predetermined starting position where the largest exposure aperture is provided. The exposure aperture setting ring 172 is formed with an arcuate slot 174 through which the exposure time adjusting pin 168 extends into engagement with the camming edge 167, and this ring 172 is also provided with an axial projection 175 which extends through an arcuate slot 176 formed in the stationary wall 177 behind which is located a conventional diaphragm having a blade adjusting ring engaged by the projection 175 which adjusts this ring so as to adjust the exposure aperture. This diaphragm may be an iris diaphragm, and the wall 177 forms a wall of the shutter housing structure which includes the pin 168. The diaphragm adjusting member 172, however, can itself be the blade adjusting ring for adjusting the diaphragm blades. Also, the ring 165, instead of having a camming edge 167, may be constructed so as to control a different type of shutter. In the illustrated example the cam 167 cooperates with the pin 168 to control a between-the-lens shutter, but if desired the ring 165 may be adapted to control a focal plane shutter.

In order to limit the angles through which the exposure aperture setting means 172 and the exposure time setting means 165 turn, the wall 177 fixedly carries a sleeve 178 provided with a pair of notches 179 and 180. The projection 171 of the aperture setting means 172 extends into the notch 179, while the projection 181 of the exposure time setting means 165 extends into the notch 180. Thus, the ends of these notches will cooperate with these projections to limit the angles through which the rings 165 and 172 can turn. The length of each of the notches 179 and 180 corresponds to the total range of adjustment of the exposure aperture and exposure time, respectively. The limiting of the turning of the exposure time setting means 165 and exposure aperture setting means 172 can, however, be carried out in other ways.

The cam 158 is provided with a camming portion 158*a* located at a relatively great distance from the optical axis and with a portion 158*d* which extends from one end of the camming portion 158*a* along an Archimedian spiral. In addition the cam 158 includes a pair of diametrically opposed camming portions 158*b* and 158*c*, and these camming portions 158*b* and 158*c* are smoothed off and flattened somewhat in the direction of turning *b* of the drive member 150, for a purpose described below.

Figure 10:
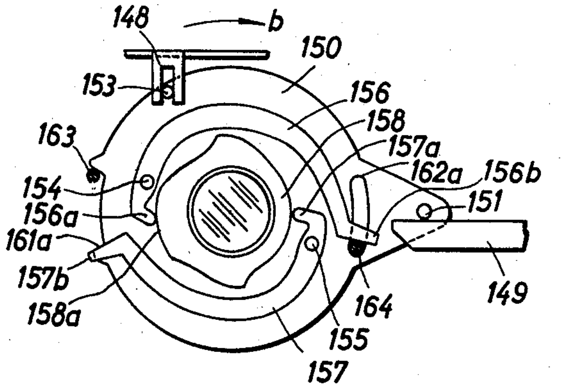
FIGS. 10–12 show respectively control structure of FIG. 9 in three different positions.

In the position of the parts shown in FIGS. 9 and 10 the cam follower portion 156*a* of the motion transmitting member 156 which cooperates with the pin 164 of the exposure time setting means engages the camming portion 158*a* of the cam 158. The end 156*b* of the motion transmitting member 156 is placed by the camming portion 158*a* in engagement with the pin 164, as shown in FIG. 10, so that in this position when the drive member 150 turns in the direction of the arrow *b* of FIG. 9, this turning will be immediately transmitted to the exposure time setting means so that the exposure time in this position of the parts will immediately start to diminish when the operator moves the arm 149 downwardly. The cam follower portion 157*a* of the motion transmitting member 157 simply lies loosely against the periphery of the cam 158 in this position of the parts so that the member 157 does not transmit any movement through the pin 163 to the ring 170 and through the projection 169*a* thereof to the exposure aperture setting means 172 during the initial part of the operation when the parts are in the position shown in FIGS. 9 and 10.

Thus, with the parts in the position of FIGS. 9 and 10 when the operator moves the arm 149 downwardly the spring 152 turns the drive ring 150 in the direction of the arrow *b* until the scanning member 148 engages the pointer of the galvanometer and thus acts through the pin 153 to terminate the turning of the ring 150 by the spring 152, and in this way the ring 150 is turned to an angular position which is indicative of the lighting conditions. Thus, the turning of the drive ring 150 with the position of the parts shown in FIGS. 9 and 10 has caused the motion transmitting means 156, 164 to turn the ring 165 and thus reduce the exposure time.

In the event that there is so much light available that when the projection 181 engages the right end of the notch 180, as viewed in FIG. 9, to provide the smallest possible exposure time, there is still too much light for a proper exposure, then the drive ring 150 will of course continue to turn beyond the point where the smallest possible exposure time is provided. The cam is so designed that the cam follower portion 156*a* of the motion transmitting lever 156 has reached the end of the camming portion 158*a* when the projection 181 reaches the end of the notch 180 to provide the shortest possible exposure time, and from this moment on the continued turning of the ring 150 moves the cam follower portion 156*a* along the camming portion 158*d* of the cam 158. The curvature of this camming portion 158*d* is such that as the ring 150 continues to turn the camming portion 158*b* cooperates with the cam follower portion 156*a* to turn the lever 156 about the pin 154 with respect to the ring 150 in such a way that the end 156*b* of the lever 156 simply slides radially along the pin 164 which now remains stationary so that during this continued turning of the ring 150 the exposure time remains at its smallest value. Moreover, at the instant when the cam follower portion 156*a* of the lever 156 reaches the end of the camming portion 158*a* and starts along the camming portion 158*d*, the end 157*b* of the motion transmitting member 157 has reached the pin 163 and the cam now cooperates with the motion transmitting member 157 to cause the drive from the drive ring 150 to be transmitted through the motion transmitting means 157, 163 to the ring 170 and from the latter to the exposure aperture adjusting means 172, so that from the time that the smallest exposure time has been provided the continued turning of the drive means will produce gradually smaller exposure apertures, and it is thus apparent that with the structure adjusted as shown in FIGS. 9 and 10 the camera will be set to provide the best possible photograph of a rapidly moving subject since the photograph will be made with that combination of exposure time and exposure aperture which includes the smallest possible exposure time.

The ring 150 includes a projection 161*a* located at one end of a notch 161 into which the pin 163 extends, and this projection 161*a* is angularly aligned with the end 157*b* of the motion transmitting member 157 and simultaneously engages the pin 163 so as to augment the action of the motion transmitting member 157. In the same way the pin 164 extends through a slot 162 formed in the drive member 150 and extending along an arc of a circle whose center is in the optical axis, and when the parts are adjusted so that the exposure time is automatically set after the exposure aperture has reached its smallest value the end 162*a* of the slot 162 engages the pin 164 simultaneously with the end 156*b* of the motion transmitting member 156 so as to augment the action of the latter. If desired these portions 161*a* and 162*a* may be relied upon by themselves to transmit the movement of the drive means to that one of the setting means which is operated only after the first setting means has been moved through its entire range of movement, so that the ends 156*b* and 157*b* need not be relied upon for this purpose, and in this event the diameter of the cam 158 may be made so small that in the illustrated example the end 157*b* of the member 157 will not engage the pin 163, and of course when the apparatus is set for operating to provide the smallest possible exposure aperture the end 156*b* will not engage the pin 164 after the apparatus has provided the smallest exposure aperture, the end 162*a* of the slot 162 performing this function in this latter event.

After the exposure has been made the operator releases the arm 149 so that it will be returned by the return spring which is stronger than the spring 152 to its starting position, and thus the ring 150 is turned in opposition to the spring 152 so as to tension the latter when the exposure time setting means 165 and exposure aperture setting means 172 are returned by the springs 166 and 173, respectively, to their starting positions determined by the engagement of the projection 171 with the lower end of the notch 179 and the projection 181 with the upper end of the notch 180.

Figure 11:
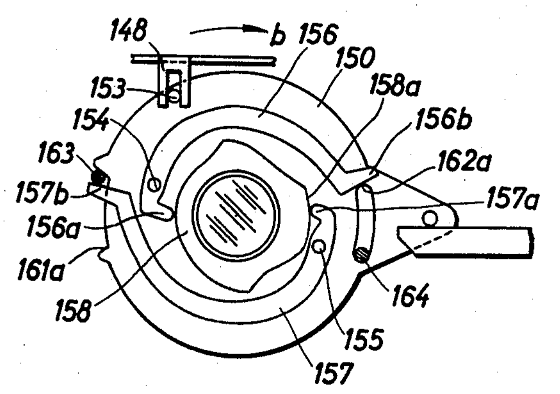

In order to manually select for the embodiment of FIGS. 9–12 a type of operation where the exposure aperture will be reduced in size while the exposure time remains at its maximum value, the operator turns the knob 159 together with the cam 158 through 180° from the position of FIG. 10 to that of FIG. 11, so that the cam follower portion 157*a* of the motion transmitting member 157 is engaged by the camming portion 158*a* of the cam 158. At this time the motion transmitting member 156 is freely turnable through a given angle about the pin 154. For the sake of clarity the motion transmitting member 156 is shown in FIG. 11 in that position which it takes after the drive member 150 has turned through an angle corresponding to the full actuation of the exposure aperture setting means by the motion transmitting member 157. Thus, when the operator moves the arm 149 downwardly, with the parts in the position shown in FIG. 11, the spring 152 will turn the drive member 150 in the direction of the arrow *b*, and during the initial phase of the rotary movement of the drive member 150 the motion transmitting member 157 will act through the pin 163 on the ring 170 so as to transmit through the latter turning movement from the projection 169 to the projection 171 and thus turn the aperture setting means 172 in opposition to the spring 173. Assuming that the amount of light available is such that it is necessary to reduce the exposure time after the exposure aperture has reached its minimum value, then in the same way as was described above in connection with the motion transmitting member 156, at the instant when the cam follower portion 157*a* reaches the end of the camming portion 158*a* and starts on the camming portion 158*d*, the end 156*b* will engage the pin 164 to start to reduce the exposure time during the continued turning of the drive member 150, and of course during this time the cam follower portion 157*a* will move along the camming portion 158*d* with the end 157*b* of the cam follower portion simply sliding along the pin 163 without angularly advancing the latter, so that during this time only the exposure time will be reduced while the exposure aperture remains at its minimum size. Thus, with the selection made according to the position of the parts illustrated in FIG. 11 the structure will operate to provide the greatest possible depth of field.

Figure 12:
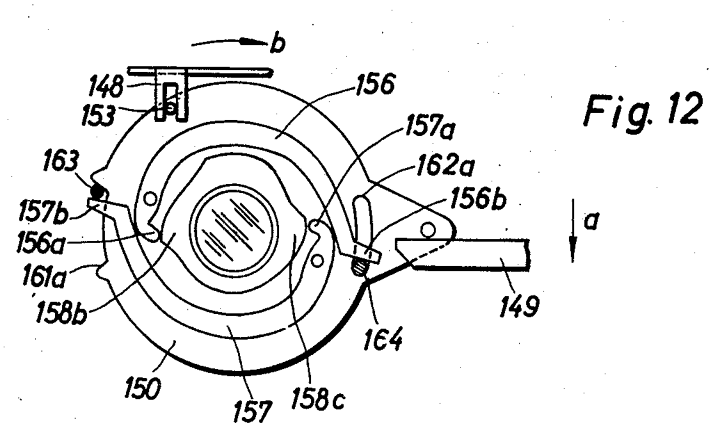

The embodiment of FIGS. 9–12 may also be set by the operator to provide a type of operation where both depth of field and speed of movement of the subject are emphasized, and the parts are set in the position shown in FIG. 12 for this type of operation. Thus, referring to FIG. 12 it will be seen that the cam 158 has been turned to the position where the camming portions 158*b* and 158*c* respectively engage the cam follower portions 157*a* and 156*a* of the motion transmitting members 157 and 156, respectively. With the parts in the position shown in FIG. 12 the operator will move the arm 149 downwardly so as to release the drive member 150 to the force of the spring 152 and the drive member 150 will turn in the direction of the arrow *b* until the scanning member 148 engages the pointer of the galvanometer so as to act on the pin 153 to terminate the turning movement of the drive member 150 and set the parts at the combination of exposure time and exposure aperture which will provide a proper exposure. As is apparent from FIG. 12 at the beginning of the operation the ends 156*b* and 157*b* of the motion transmitting members 156 and 157 engage the pins 164 and 163, respectively, so that during the initial part of the turning of the drive member 150 both the exposure time and the exposure aperture will be reduced. The curvature of the cam 158 just beyond the crests of the camming portions 158*b* and 158*c* is such that these camming portions gradually approach the center of the cam, and thus during the turning of the drive member 150 and the motion transmitting members 156 and 157 therewith, these motion transmitting members will be able to turn with respect to the drive member 150, and the curvature of the camming portions 158*b* and 158*c* is such that each of the motion transmitting members 156 and 157 turns through one-half the angle that the drive member 150 turns through.

Of course, the cam 158 may have any desired configuration to give any desired type of operation. Thus, it is possible to so shape the camming portions 158*b* and 158*c* that during the initial part of the turning of the drive member 150 both the exposure time and the exposure aperture are uniformly reduced while during a successive portion of the turning movement of the drive member 150 when the amount of light is so great that further reduction in exposure time and/or exposure aperture is required the camming portions can be so shaped that first the one and then the other of the setting means can be acted upon. Of course care should be taken to guarantee that at all angular positions of the drive member 150 and the motion transmitting members 156 and 157 with respect to the cam 158 the product of the light values given by the settings of the exposure time and exposure aperture will be equal to the light value measured by the light meter since this latter value is proportional to the angular position of the drive member 150.

Figure 13:
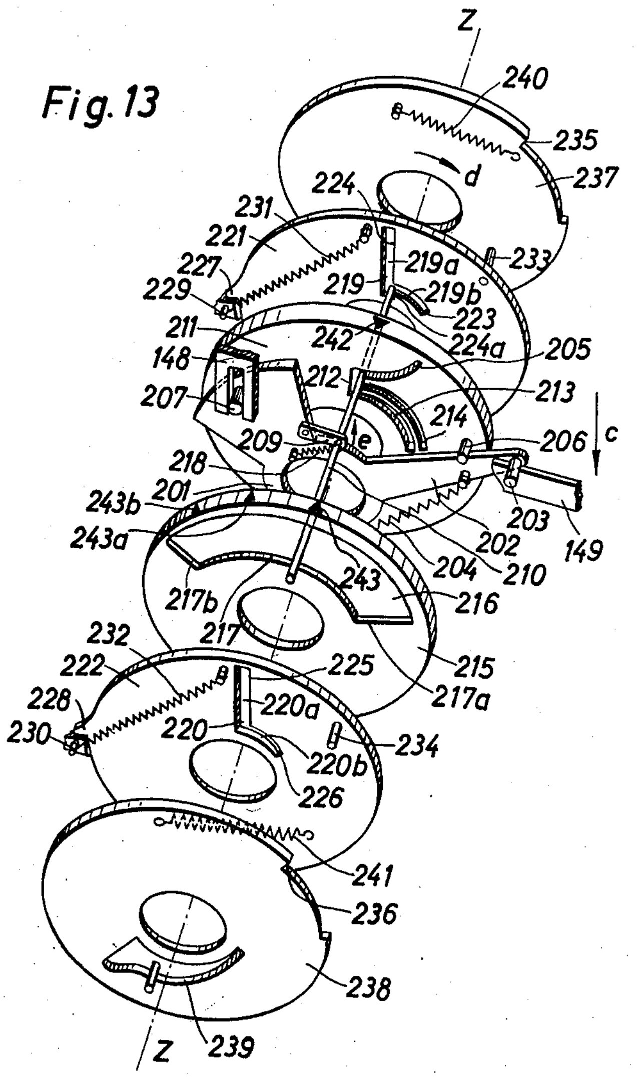
FIG. 13 is a perspective exploded view of a further type of a structure according to the present invention.

Referring now to FIG. 13, the embodiment of the invention illustrated therein includes an annular driving member 201 which is supported for rotary movement about the optical axis Z—Z. The rotary member 201 which forms part of the operating means of the embodiment of FIG. 13 includes a radial projection 202 carrying a pin 203 which is maintained in engagement with the arm 149 by the driving spring 204 which is connected at one end to a pin which is fixed to the projection 202 and which is connected at its opposite end to a stationary part of the camera. In the embodiment of FIG. 13 the arm 149 is held in its rest position by a spring which is stronger than the spring 204, as was the case with the embodiment of FIG. 9, and the spring which acts on the arm 149 serves to maintain the projection 202 of the driving member 201 in engagement with a stationary pin 206. The driving member 201 also carries a pin 207 which is received in a bifurcated portion 148 of a scanning member which operates in the same way as the scanning member 148 of the embodiment of FIG. 9. Thus, in the same way as with the embodiment of FIG. 9 when the operator wishes to make an exposure he depresses the arm 149 in the direction of the arrow *c* of FIG. 13 and this releases the member 201 to the force of the spring 204 which turns the driving member so as to act through the pin 207 on the scanning member 148 to move the latter until an additional member which is operated by the member 148 engages the pointer of the galvanometer, and the same is of course true in the embodiment of FIG. 9. In this way the extent to which the spring 204 turns the member 201 will be determined by the lighting conditions.

The member 201 is pivotally connected with a lever 209 which carries an elongated motion transmitting member 210 in the form of an elongated rod which extends substantially parallel to the optical axis Z—Z.

Adjacent to the driving member 201 is located a stationary plate 211 which carries the stationary pin 206 referred to above. For example, the stationary plate 211 may be fixedly located within a stationary tube which surrounds the optical axis, and the plate 211 is formed with a substantially radial slot 212 which communicates with a pair of arcuate slots 213 and 214 which respectively extend along circles whose centers coincide with each other and with the optical axis. In addition a slot 205 communicates with the radial slot 212, and these slots 205, 213 and 214 serve to guide the motion transmitting rod 210 in a manner described below. It will be noted that the slot 205 is curved so that it has a slope opposite to the slope of the slots 213 and 214.

The embodiment of FIG. 13 also includes a manually operable selecting means for selecting the particular type of operation desired, and this selecting means is in the form of a rotary member 215 which is supported for rotary movement about the optical axis. This selecting means 215 is formed with an arcuate cutout 216 whose lower edge 217 forms a camming edge cooperating with the motion transmitting member 210 to control the elevation of the latter. The curvature of the camming edge 217 is such that its region 217*a* is at a lesser distance from the optical axis than its opposite region 217*b*, and the edge 217 curves gradually from its region 217*a* to its region 217*b*. The motion transmitting rod 210 extends through the cutout 216 and is maintained against the edge 217 thereof by a spring 218 which is connected at one end to the driving member 201 and at its opposite end to the rod 210 adjacent to the lever 209.

The embodiment of FIG. 13 further includes a pair of rotary rings 221 and 222, and these rings are respectively formed with the slots 219 and 220. The rod 210 extends into the slots 219 and 220. When the structure of FIG. 13 is in its rest position the slots 219 and 220 respectively have portions 219*a* and 220*a* which are respectively in radial alignment with the slot 212. The slot 219 communicates with an arcuate slot 219*b* which extends along a circle whose center is in the optical axis, and this slot 219*b* communicates with the slot 219 at a distance slightly higher than the lower end of the slot 219 so that this slot 219 has above the arcuate slot 219*b* an edge 224 and below the slot 219*b* an edge 224*a*. The radial slot 220 communicates at its lower end with an arcuate slot 220*b* which also extends along a circle whose center is in the optical axis. The edges 224 and 224*a* of the slot 219 forms stop edges engaged by the motion transmitting member 210 when the latter turns the ring 221 in the direction of the arrow *d* of FIG. 13, and the end 223 of the slot 219*b* forms an additional stop which is adapted to be engaged by the motion transmitting member 210 for a purpose described below. The radial distance of the slot 219*b* from the optical axis is the same as the radial distance of the slot 214 from the optical axis. In the same way the edge 225 of the slot 220*a* forms a stop edge which is adapted to be engaged by the rod 210 when the latter turns the ring 222 in the direction of the arrow *d*, and also the end 226 of the slot 220*b* forms a stop adapted to be engaged by the rod 210 for a purpose described below. The slot 220*b* is located from the optical axis by the same distance as the slot 213.

In the rest position of the parts the ring 221 has a projection 227 engaging a stationary stop member 229, while the ring 222 has the projection 228 engaging the stationary stop member 230. A spring 231 is connected at one end to the stop member 229 and at its opposite end to a pin which is fixed to the ring 221 so as to maintain the projection 227 thereof in engagement with the stop member 229, while a spring 232 is connected at one end to the pin 230 and at its opposite end to a pin which is carried by the ring 222 so as to maintain the projection 228 thereof against the stop 230. Thus, the springs 231 and 232 urge the rings 221 and 222, respectively, in a direction opposite to that indicated by the arrow *d* of FIG. 13.

In addition, the ring 221 fixedly carries a pin 233, while the ring 222 fixedly carries a pin 234. The pin 233 cooperates with a stop edge 235 which forms one end of an arcuate notch formed in the periphery of a ring 237, while the pin 234 cooperates with a stop edge 236 which forms one end of an arcuate notch formed in the periphery of the ring 238. The ring 237 forms the rotary ring of a known iris diaphragm while the ring 238 is formed with a cutout having a camming edge 239 which controls the exposure time in a well-known manner. This camming edge 239 controls a known between-the-lens shutter. Thus, the rings 221 and 237 together form the exposure aperture setting means of the embodiment of FIG. 13, and these rings are interconnected by the spring 240 one end of which is fixed to the ring 237 and the other of which is fixed to the pin 233 so as to yieldably maintain the latter in engagement with the stop edge 235. In the same way the rings 222 and 238 form the exposure time setting means of the embodiment of FIG. 13, and the spring 241 is fixed at one end to the ring 238 and at its opposite end to the pin 234 to as to maintain the latter yieldably in engagement with the stop edge 236.

It will be noted that with the parts in the position indicated in FIG. 13, the camming edge 217 has its region 217*a* which is nearest to the optical axis engaging the rod 210, and thus the rod 210 is located at its position nearest to the optical axis, and in this position the rod 210 engages the stop edge 224*a* of the slot 219. With the parts in this position when the operator makes an exposure he will lower the arm 149 so as to release the drive member 201 to the spring 204 which turns the drive member 201 until the element 148 of the scanning means cannot move further so that the member 201 assumes a position which is indicative of the lighting conditions. The turning of the member 201 will cause the rod 210 to move along the slot 213 which is the guide slot nearest to the optical axis and the rod 210 is of course located at the elevation of the slot 213 with the parts in the position of FIG. 13. Because the rod 210 at this time engages the stop 224*a*, the ring 221 of the aperture setting means will turn in the direction of the arrow *d* in opposition to the spring 231, and through the spring 240 the ring 237 will turn with the ring 221 the stop edge 235 and the pin 233 remaining in engagement with each other at this time. Also, at this time the rod 210 will be located at the elevation of the arcuate slot 220*b* formed in the ring 222 so that the rod 210 will move along the slot 220*b* without turning the ring 222. Thus, the structure operates at this time to gradually reduce the size of the exposure aperture while the exposure time remains at its maximum value, and thus with the parts in the position of FIG. 13 that type of operation is provided which will produce the greatest possible depth of field.

Assuming that there is so much light available that when the smallest exposure aperture provided by the diaphragm of the camera is reached it is necessary to reduce the amount of light reaching the film in order to make a proper exposure, then the continued turning of the drive member 201 will not produce any further turning of the ring 237 but will instead start to cause the exposure time to be reduced, and this result is brought about by engagement of the rod 210 with the end 226 of the slot 220*b* at the instant when the exposure aperture has reached its smallest size. Thus, during the continued turning of the drive member 201 beyond the point where the smallest aperture has been provided the exposure time will be reduced. The ring 237 cannot turn beyond this point because the diaphragm is set to its smallest size, and therefore at this time the ring 221 will turn in the direction of the arrow *d* beyond and with respect to the ring 237 in opposition to the spring 240 so that at this time the pin 233 will move away from the stop edge 235.

After the exposure has been made the return spring which acts on the arm 149 and which is stronger than the drive spring 204 will return the arm 149 to the position shown in FIG. 13 and will of course tension the spring 204 while maintaining the projection 202 of the drive member 201 in engagement with the stationary stop member 206. The springs 231 and 232 will return the exposure time setting means and the exposure aperture setting means to their starting positions where they provide the longest exposure time and the largest aperture, respectively.

It will be noted that with the parts in the position shown in FIG. 13 the mark 243 on the manually operable means 215 is aligned with the stationary index 242 which is located at the periphery of the stationary member 211. Thus, in order to provide a type of operation where the greatest depth of field will be provided, assuming that the exposure aperture and exposure time are at their greatest values when in their rest positions, the operator will align the mark 243 with the index 242. If another type of operation is desired the operator will turn the ring 215 so as to align either the mark 243*a* or the mark 243*b* with the stationary index 242. These marks 243, 243*a* and 243*b* may have different colors or may be in the form of different symbols which will indicate to the operator the type of operation which will be obtained when the selected mark is aligned with the index 242.

When the operator places the mark 243*a* in alignment with the stationary index 242, the camming edge 217 will locate the motion transmitting rod 210 at the elevation of the slot 214 as well as at the elevation of the slot 219*b*. Of course, this adjustment has raised by rod 210 slightly above the slot 220*b* so that the rod 210 engages the edge 225 of the slot 220*a*. This turning of the member 215 has moved the rod 210 in opposition to the spring 218 in the direction of the arrow *e* shown in FIG. 13. Now when the operator moves the arm 149 so as to make an exposure, the turning of the member 201 will cause the rod 210 to act through the edge 225 on the ring 222 so as to reduce the exposure time, and during movement of the rod 210 along the guide slot 214 it will also move along the slot 219*b* so that the ring 221 and thus the entire exposure aperture setting means will remain stationary at least until the smallest exposure time which the exposure time setting means can provide is obtained. If so much light is available that it is necessary to reduce the exposure aperture after the shortest exposures time is reached, the ring 238 will be incapable of turning further since it will be at the position providing the shortest exposure time and the continued turning of the rod 210 will cause the ring 222 to turn with respect to the ring 238 in opposition to the spring 241 so that the pin 234 moves away from the stop 236 at this time. Moreover, at the instant when the smallest possible exposure time has been reached the rod 210 has reached the end 223 of the slot 219*b*, so that the continued turning of the drive member 201 will now cause the rod 210 by its engagement with the stop 223 to turn the ring 221 so that the exposure aperture will now be reduced. Thus, when the mark 243*a* is aligned with the index 242, assuming that the exposure time and the exposure aperture have their largest values in their rest positions, the structure will provide an operation where the best possible photograph will be made of a rapidly moving subject.

When the operator turns the manually operable selecting means 215 until its mark 243*b* is aligned with the index 242, the camming edge 217 will move the rod 210 in opposition to the spring 218 further in the direction of the arrow *e* until this rod 210 is at the elevation of that end of the guide slot 205 which communicates with the radial slot 212. At this time the rod 210 simultaneously engages the stop edge 224 of the slot 219*a* and the stop edge 225 of the slot 220*a*. Thus, when the operator moves the arm 149 down with the parts in this position in order to make an exposure both the exposure time setting means and the exposure aperture setting means will be turned simultaneously so that with the parts in this position an exposure will be made to take into consideration both the movement of the subject and the depth of field. Because of the slope of the guide slot 205 the rings 221 and 222 will not turn through the same angle as the drive member 201. They will turn through a lesser angle than the drive member 221, and the slope of the guide slot 205 is such that the product of the exposure aperture and exposure time values in all positions of the parts is equal to the measured light value which is proportional to the angle through which the drive member 201 turns. Thus, with the mark 243*b* aligned with the index 242 it is possible to photograph moving subjects without giving up the benefit of a substantial depth of field.

Figure 14:
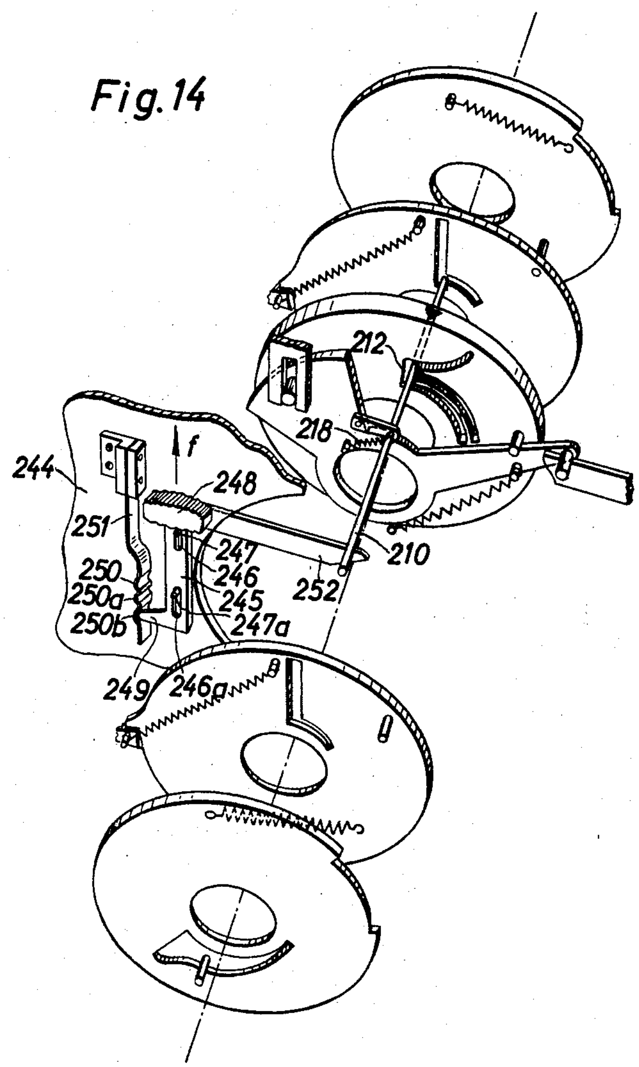
FIG. 14 shows another type of selecting structure for the embodiment of FIG. 13.

The embodiment of the invention which is illustrated in FIG. 14 corresponds to that of FIG. 13 but includes a different manually operable means for selecting the desired type of operation. Instead of a ring with a camming edge, the embodiment of FIG. 14 includes a stationary wall 244 on which a slide 245 is guided for movement in the direction of the arrow *f* or in a direction opposite to that of the arrow *f*. The slide member 245 is formed with the elongated slots 246 and 246*a* which respectively receive the pins 247 and 247*a* which are fixed to the wall 244 so that in this way the slide member 246 is guided for movement along a straight line. The slide member 245 is fixed with a fingerpiece 248 which is accessible at the exterior of the camera so that the operator by engaging the fingerpiece 248 may move the slide 245 either in the direction of the arrow *f* or in the opposite direction. At its lower end the slide member 245 is integral with a projection 249 which cooperates with a leaf spring 251 for determining the selected position of the slide member 245. Thus, the leaf spring 251 which is fixed at its upper end to a bracket which is carried by the wall 244 is formed with the depressions 250, 250*a* and 250*b* which are adapted to selectively receive the projection 249. When the operator wishes to change the position of the projection 249 the spring 251 will yield and the projection 249 will snap into the selected depression of the spring 251. It will be noted that the spring 251 extends in the same general direction as the direction of movement of the slide member 245. This slide member 245 in addition carries an arm 252 against whose outer end the motion transmitting rod 210 bears under the influence of the spring 218 described above in connection with FIG. 13.

The finger piece 248 may carry any suitable index to be aligned with a lower, an intermediate, or a higher mark located one above the other at the exterior of the camera, and in this way the projection 249 will be located in the depression 250*b*, the depression 250*a*, or the depression 250, respectively. The movement of the slide member 245 will result in a change in the elevation of the rod 210 and the same results are produced as are produced with the embodiment of FIG. 13 by turning of the ring 215. Thus, when the parts are in the position of FIG. 14 the structure will produce the same type of operation that is provided by alignment of the mark 243 with the index 242 of FIG. 13, while when the projection 249 is in the depression 250*a* the same results will be produced as are obtained when the operator aligns the mark 243*a* of FIG. 13 with the index 242, and of course when the operator locates the slide 245 at its highest position with the projection 249 in the depression 250 the structure of FIG. 14 will operate in the same way as when the mark 243*b* of FIG. 13 is aligned with the index 242.

Figure 15:
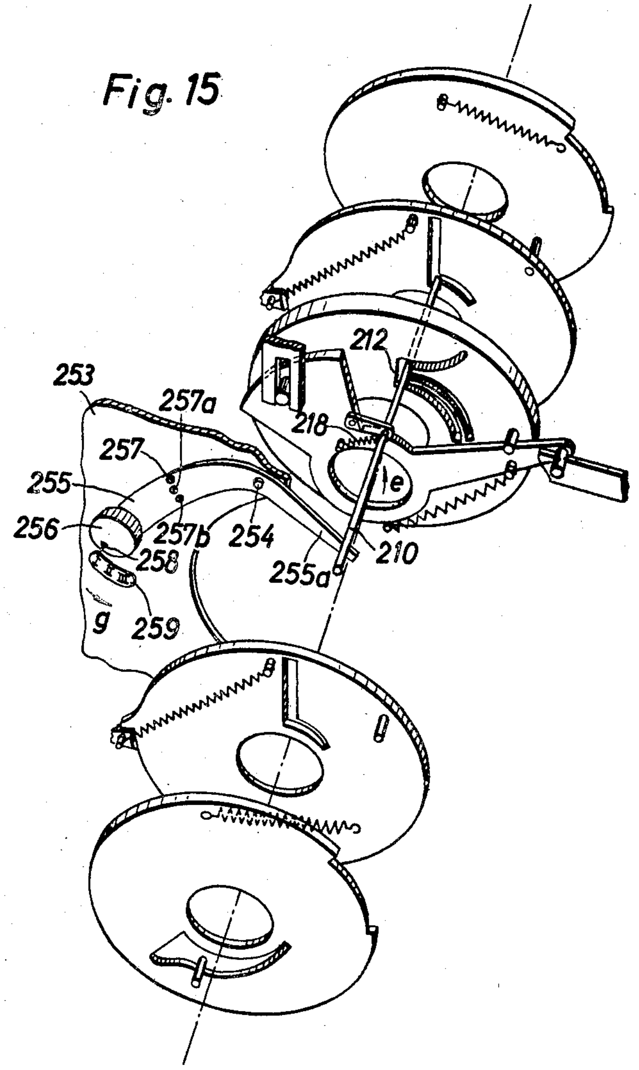
FIG. 15 shows a third type of selecting structure for the embodiment of FIG. 13.

FIG. 15 shows yet another embodiment of the structure of the invention where the structure is identical with that of FIG. 13 except for the construction of the manually operable selecting means which is manipulated to provide the desired type of operation. With the embodiment of FIG. 15 there is a stationary wall 253 which carries a stationary pin 254 on which a selecting lever 255 is supported for pivotal movement. The lever 255 is a two-armed lever, and one of its arms carries the finger piece 256 which is located at the exterior of the camera and accessible to the operator. The other arm 255*a* of the lever has its free end engaged by the motion transmitting rod 210 which is maintained in engagement with the arm 255*a* by the spring 218 described above in connection with FIG. 13. The lever 255 is formed with three openings 257, 257*a* and 257*b*, and in order to yieldably maintain the lever 255 in a selected position a detent in the form of a spring pressed ball, for example, carried by the wall 253 cooperates with the selected opening 257, 257*a*, or 257*b* to yieldably maintain the lever 255 in the position selected by the operator.

The finger piece 256 carries an index 258 which is adapted to be aligned with a selected one of the indicia of the scale 259. The parts are shown in FIG. 15 in the position where the arm 255*a* is nearest to the optical axis so that the rod 210 is nearest to the optical axis, and of course with the parts in this position the operation will be the same as when the mark 243 of FIG. 13 is aligned with the index 242. In order to provide a different type of operation the operator will turn the finger piece 256 in the direction of the arrow *g* of FIG. 15 so as to align the index 258 with either one of the other indicia of the scale 259. Aligning the index 258 with the intermediate mark of the scale 259 will locate the rod 210 at its intermediate elevation providing the same operation as when the mark 243*a* of FIG. 13 is aligned with the index 242, and further turning of the finger piece 256 in the direction of the arrow *g* to locate the index 258 in alignment with the mark at the right end of the scale 259 of FIG. 15 will locate the rod 210 at its position most distant from the optical axis to provide the same operation as is provided by alignment of the mark 243*b* of FIG. 13 with the index 242.

Except for the differently constructed selecting means the embodiment of FIG. 15 is identical with that of FIG. 13.

Figure 17:
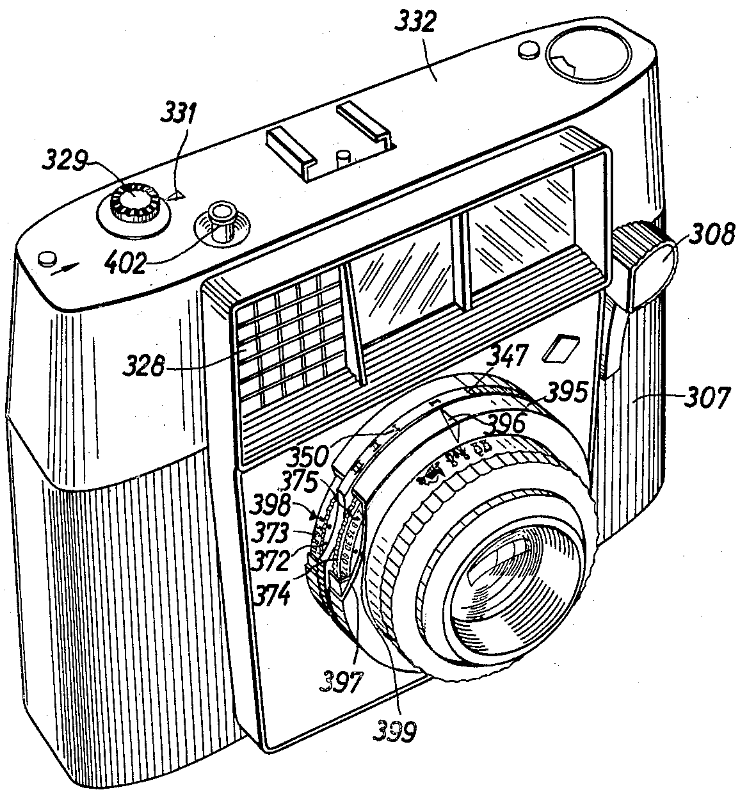
FIG. 17 shows the structure of FIG. 16 as it appears when incorporated into a camera shown in a front perspective view in FIG. 17.

Referring now to the embodiment of the invention which is illustrated in FIGS. 16 and 17, this embodiment includes, as shown in FIG. 16, a rotary member 301 which forms part of the drive means of this embodiment, and this drive means forms part of the operating means for operating the various components. The ring 301 is supported for rotary movement about the optical axis Z—Z and is integral with a radial extension 302 which carries a pin 303. A drive spring 304 is connected at one end to a stationary part of the camera and at its opposite end to the arm 302 so as to maintain the pin 303 in engagement with the arm 305 which corresponds to the arm 149 of the embodiment of FIGS. 9–15. The arm 305 has an extension 306 which is fixed with a finger piece 308 accessible at the front wall 307 of the camera, as indicated in FIG. 17, so that the operator may engage the finger piece 308 to move the arm 305 downwardly. A return spring 309 stronger than the spring 304 returns the parts to their rest position and maintains them in this position when the camera is not operating. This manually operable structure of FIG. 16 for releasing the ring 301 to the drive spring 304 is also used with the embodiments of FIGS. 9–15.

The ring 301 fixedly carries a pin 310 received in a bifurcated portion 311 of a member 312 which corresponds to the member 148 of FIGS. 9–15 and which actuates an element which is a scanning member for engaging the pointer of the galvanometer. The elongated member 312 is formed with a longitudinal slot 313 receiving a pair of pins 314 carried by the stationary wall 315 so that in this way the member 312 is guided for movement to the right and left, as viewed in FIG. 16. The member 312 has an upwardly directed extension 316 and a rearwardly directed extension 317. The extension 316 is engaged by the portion 318 of a movable jaw member 319 which is guided for movement on the stationary jaw member 322, these jaw members 319 and 322 serving to engage the galvanometer pointer when an exposure is to be made. The stationary jaw member 322 has a portion 321 against which one end of a compression spring 320 bears, and the other end of the spring 320 presses against the portion 318 of the movable jaw 319 so as to maintain this portion 318 in engagement with the extension 316 of the member 312. The movable jaw 319 has an arcuate toothed portion 323 which overlaps a cutout formed in the stationary jaw member 322, and this cutout is limited at its right end by the arcuate edge 324. This edge 324 and the edge 323 defined between themselves an arcuate slot in which the pointer 325 of the galvanometer 326 is free to swing when the parts are in their rest position. The galvanometer 326 is connected by the leads 327 to a photocell 328 which receives the light so as to actuate the galvanometer 326 for locating the pointer 325 at angular positions indicative of the light intensity. The galvanometer 326 is carried by a member 329 which is accessible at the upper wall 332 of the camera, and this member 329 is in the form of a knob which may be manually turned. As extension fixed to the underside of the member 329 extends through an opening in the top wall 332 of the camera and is fixed to the housing of the galvanometer 326 so that this galvanometer will turn with the knob 329. The knob 329 carries a scale 330 of film speeds adapted to be aligned with the stationary index 331 at the top of the camera, so that in this way by turning the knob 329 the operator will place the galvanometer at an angular position determined by the speed of the film which is placed in the camera. The pointer 325 has a downwardly directed springy end portion which extends through the arcuate gap formed between the edges 324 and 325 of the stationary and movable jaws, respectively, and at the elevation of the lower end portion of the pointer 325 is located a rotary scanning member 333 supported for turning movement about an axis parallel to that of the galvanometer and carrying a pin 334 which engages the rearward extension 317 of the member 312. A spring 335 is connected at one end to the scanning member 333 so as to maintain its pin 334 in engagement with the extension 317 of the member 132, and the opposite end of the spring 335 is fixed to a stationary pin of the camera. The rotary scanning member 333 has a projection 333a which is adapted to engage the pointer 325 when the scanning member 333 is turned by movement of the member 312 to the right, as viewed in FIG. 16.

Thus, with the above-described structure when the operator depresses the finger piece 308 so as to release the member 301 to the spring 304, the pin 310 will turn in the direction of the arrow a with the member 301 so as to advance the slide member 312 to the right. The initial part of the movement of the member 312 will permit the spring 320 to expand so that the movable jaw 319 will shift toward the right, as viewed in FIG. 16, and thus the movable jaw 319 will have its edge 323 placed in engagement with the pointer 325 to clamp the latter between the edge 323 of the movable jaw 319 and the edge 324 of the stationary jaw 322, and in this way these jaws grip the pointer 325 to maintain it stationary and to protect the galvanometer structure from any shocks produced by engagement of the projection 333a with the pointer 325. The member 312 will continue to move to the right during the turning of the member 301 until the extension 333a of the scanning member 333 engages the pointer 325. The movement of the member 312 will cause its extension 317 to act on the pin 334 so as to turn the scanning member 333 in opposition to the spring 335 until the extension 333a engages the pointer 325. In this way the extent to which the member 301 will be turned by the drive spring 304 is determined by the lighting conditions, and the above-described structure of FIG. 16 may also be used for the same purpose with the embodiments of FIGS. 9–15.

The drive of FIG. 16 includes in addition to the rotary member 301 the rotary member 337 which is supported for rotary movement on the stationary inner tube 338 which is partially illustrated in FIG. 16 and which supports most of the rotary members for rotation about the optical axis Z—Z. The member 301 fixedly carried a pin 336 which extends into the notch 337a of the rotary member 337, so that in this way the members 301 and 337 turn as a unit, and thus with the embodiment of FIG. 16 the drive includes the pair of members 301 and 337 rather than a single rotary member as in the case of FIGS. 9–15.

The embodiment of FIG. 16 is similar to that of FIG. 13 and includes an elongated motion transmitting rod 340 which extends substantially parallel to the optical axis Z—Z. The member 337 is pivotally connected to the lever 339 which carries the rod 340, and a spring 349 acts on the rod 340 to urge it in a direction opposite to that indicated by the arrow c in FIG. 16. The spring 349 is connected at one end to a pin carried by the rotary member 337 and at its opposite end to the rod 340.

A stationary plate 342 is fixed to the tube 338 and is formed with a radial slot 341 through which the motion transmitting rod 340 extends, and this slot 341 communicates with the arcuate slots 343 and 344 which are identical with slots 213 and 214 of FIG. 13. In addition the radial slot 341 communicates with the slot 345 which is identical to the slot 205 of FIG. 13.

The rod 340 extends through the arcuate cutout 346 which is formed in the rotary manually turnable selecting member 347 which corresponds to the member 215 of FIG. 13. The lower edge 348 of the cutout 346 forms a camming edge corresponding to the edge 217 of FIG. 13, and the end 348a of the edge 348 is closer to the optical axis than the end 348b of the camming edge 348. The spring 349 maintains the rod 340 in engagement with the camming edge 348. The edge 350 of the manually turnable selecting ring 347 carries marks similar to the marks 243, 243a and 243b and adapted to be aligned with a stationary index for the purpose of providing a desired type of operation, as was described above in connection with FIG. 13.

The rod 340 extends into a radial slot 351 formed in the ring 353 which corresponds to the ring 221 of FIG. 13. The slot 351 is formed with a stop edge 355 and just above its lower end the slot 351 communicates with an arcuate slot 351b terminating at its free end in the stop 356 which corresponds to the stop 223 of FIG. 13. Just below the slot 351b the slot 351 is provided with the stop edge 355a which is engaged by the rod 340 in the same way that the stop 224a is engaged by the rod 210 of FIG. 13. In the rest position of the parts the portion 351a of the slot 351 is in angular alignment with the slot 341 of the stationary plate 342. The front end of the rod 340 extends into the radial slot 352 which is formed in the ring 354 which corresponds to the ring 222 of FIG. 13, and at its lower end the radial slot 352 communicates with the arcuate slot 352b which terminates in the stop 358 which corresponds to the stop 226 of FIG. 13. The edge 357 of the slot 352 forms a stop edge in the same way as the edge 225 of the slot 220 of FIG. 13, and in the rest position of the parts the portion 352a of the slot 352 is in angular alignment with the slot 341 of the stationary plate 342. The arcuate slot 351b of the ring 353 is at the same distance from the optical axis as the arcuate slot 344 of the plate 342, and the arcuate slot 352b of the ring 354 is at the same radial distance from the optical axis as the arcuate slot 343 of the stationary plate 342.

The ring 354 is formed at its inner periphery with an arcuate notch 359 whose end 359a cooperates with the projection 360 of the stationary tube 338 for determining the rest position of the ring 354, this projection 360 extending into the notch 359 so as to limit the range of angular turning of the ring 354. A spring 361 is connected at one end to a stationary part of the camera and at its opposite end to a pin carried by the plate 354 so as to maintain the end 359a of the notch 359 in engagement with the stop projection 360 when the parts are at rest. In much the same way the rotary member 353 is formed at its inner periphery with an arcuate notch 362 which cooperates in the same way as the notch 359 with an unillustrated projection of the tube 338 for limiting the turning of the ring 353 and for determining the rest position thereof. Thus, the spring 363 is connected at one end to a stationary part of the camera and at its opposite end to a pin which is fixed to the ring 353 so as to maintain the upper end of the notch 362, as viewed in FIG. 16, in engagement with the unillustrated stop projection extending from the tube 338 into the notch 362.

The ring 353 fixedly caries a leaf spring 364 which extends parallel to the optical axis and which terminates in a springy tooth 366. The ring 354 carries a leaf spring 365 which also extends parallel to the optical axis and which terminates in a springy tooth 367. The springy tooth 366 cooperates with the teeth 368 formed at the periphery of a ring 370 supported for rotation about the optical axis and forming with the ring 353 the exposure aperture setting means of the embodiment of FIG. 16, and the tooth 367 of the spring 365 cooperates with the teeth 369 formed at the periphery of the ring 371 which is supported for rotary movement about the optical axis and which forms with the ring 354 the exposure time setting means of the embodiment of FIG. 16. The length of the springs 364 and 365 has been greatly exaggerated in FIG. 16 in order to show the cooperation between the elements. In the actual construction the ring 370 is located directly next to the ring 353 while the ring 354 is located directly next to the ring 371 and the leaf springs 364 and 365 are actually quite short. The ring 370 has an exterior knurled portion 372 accessible to the operator under the conditions described below so that the ring 370 may be manually adjusted, and the ring 370 in addition carries a scale 373 which indicates to the operator the size of the exposure aperture. In the same way the ring 371 has a knurled portion 374 to facilitate manual turning of the ring 371, and this ring carries a scale 375 of exposure times. The ring 370 fixedly carries a projection extending parallel to the optical axis through the arcuate cutout 376 formed in the rotary member 301, and this unillustrated projection cooperates with a rotary diaphragm ring which is connected to blades of the diaphragm for turning these blades so as to adjust the exposure aperture. The ring 371 is formed with a cutout whose lower edge 377 forms a cam for controlling the exposure time, and this edge cooperates with the pin 378 of the exposure time adjusting structure of a conventional between-the-lens shutter. A spring 379 is located between and respectively connected to the rings 370 and 353 for yieldably maintaining the springy tooth 366 in engagement with the last tooth of the toothed portion 368 of the ring 370, as shown in FIG. 16, and in the same way the spring 380 is located between and respectively connected with the rings 354 and 371 for yieldably maintaining the springy tooth 367 in engagement with the last tooth of the toothed portion 369 of the ring 371, as illustrated in FIG. 16.

The stationary plate 342 fixedly carries a pivot pin on which a lever 381 is turnable so that this lever 381 is turnably connected with the plate 342, and the lever 381 fixedly carries an elongated lock rod 382 which extends parallel to the optical axis. The lock rod 382 extends through an elongated arcuate slot 383 which is formed in the rotary, manually operable selecting member 347. The pivotal mounting of the rod 382 on the plate 342 by the lever 381 is such that with the parts in the position shown in FIG. 16 the lock rod 382 is located beside and aligned with the peripheral notches 384, 385, and 386 which are respectively formed in the plate 342 and the rotary rings 353 and 354, and the lock rod 382 also is aligned with the radial cutouts 387 and 388 respectively formed in the rings 370 and 371. The cutout 387 of the ring 370 communicates with an arcuate slot 389 formed in the plate 370, and the ring 371 has an arcuate slot 390 which communicates with the cutout 388. In the rest position of the parts the upper portion 390*a* of the slot 390 is in alignment with the slot 389 of the plate 370, and the slot 390 has a lower portion 390*b*. The edges which form the slot 390 are all smooth except for the edge 391 shown in FIG. 16, this edge 391 being formed with teeth. The lock rod 382 extends at its rear end to a position beside and just to the right of the upwardly directed extension 305*a* of the member 305, as viewed in FIG. 16, and this extension 305*a* is formed with a notch 305*b* for a purpose described below. The slot 383 formed in the selecting ring 347 has a camming edge 383*a* which controls the position of the lock rod 382, and a spring 403 is connected at one end to the plate 342 and at its opposite end to the rod 382 to urge the latter to turn in the direction of the arrow *d* and to maintain the rod 382 against the camming edge 383*a* of the slot 383.

The rings 370, 353, and 342 are respectively formed with the arcuate slots 392, 393, and 394 all of which are aligned with each other and with the same curvature, and the pin 336 which is fixed to the ring 301 extends through these slots 392, 393, and 394 into the notch 337*a* of the rotary member 337, and the length of the slots 392–394 is such that under all conditions of operation the pin 336 turns at all times freely in these slots and never engages their ends.

All of the coaxial rings of FIG. 16 whose common axis coincides with the optical axis, with the exception of the ring 301, are located within a stationary outer tube 395 shown in FIG. 17 located at the front of the camera, and this tube 395 has a pair of axially spaced front and rear portions which define between themselves an annular gap through which the periphery of the ring 347 extends so that the periphery of this ring is visible and accessible to the operator. The tube 394 carries a stationary index 396 with which the marks 350 at the periphery of the ring 347 are selectively aligned. The tube 395 is formed with an arcuate notch 397 in which the knurled portions 372 and 374 of the rings 370 and 371 are accessible when the camera is set for manual operation. At surfaces which are adjacent to the notch 397 are located a pair of indexes 398 and 399 which respectively cooperate with the scales 373 and 375 of the rings 370 and 371, respectively.

In order to prevent inadvertent manual operation of the rings 370 and 371 when the camera is set for automatic operation, the ring 347 is provided with a pair of arcuate cover strips 400 and 401 which extend across the notch 397 and cover the knurled portions 372 and 374 when the ring 347 is in any of the annular positions which provide for automatic operations. When the ring 347 is turned to the position provided for manual operation the strips 400 and 401 turn along the inner surface of the tube 395 within the latter and uncover the notch 397 so that the knurled portions 372 and 374 are accessible. In order to release the shutter so as to make an exposure a manually operable plunger 402 is provided, as shown in FIG. 17, although, if desired, the member 306 may be used to trip the shutter after the finger piece 308 has been depressed through a distance great enough to guarantee that under all lighting conditions the exposure setting means have reached their final positions.

Assuming that it is desired to make an exposure with the parts shown in the embodiment of FIGS. 16 and 17, the operator will first turn the ring 347 until the desired symbol of the scale 350 is located in alignment with the index 396. The parts are shown in FIG. 16 where the symbol I has been placed in alignment with the index 396 so as to provide the particular type of operation indicated by the symbol I. Having made his selection of the type of automatic operation desired, the operator will engage the finger piece 308 and will move the member 6 downwardly in opposition to the return spring 309. This downward movement will release the member 301 to the force of the drive spring 304 and thus the slide member 312 will move to the right, and the spring 320 will expand so as to cause the movable jaw 319 to move toward the edge 324 of the stationary jaw and thus the point of the galvanometer will be clamped and the scanning member 333 will have its projection 333*a* moved into engagement with the point of the galvanometer during the shifting of the member 312 brought about by turning of the member 301, and thus the member 301 will be turned by the spring 304 until the angular position of the member 301 corresponds to the light received by the photocell 328.

The turning of the ring 301 is transmitted by the pin 336 to the ring 337 which during its turning will turn the motion transmitting rod 340. With the parts in the position of FIG. 16 the rod 340 is at its position closest to the optical axis engaging the stop surface 355*a* of the slot 351 and located at the same radial distance from the optical axis as the slots 343 and 352*b*. Thus, during the turning of the ring 337 the motion transmitting rod 340 will press against the stop 355*a* to turn the ring 353 in the direction of the arrow *a* shown in FIG. 16, and the ring 370 will turn with the ring 353. This result is brought about because the spring 379 maintains the springy tooth 366 in engagement with the right end of the toothed portion 368. It should be noted that at the right end of the tooth portion 368 the periphery of the ring 370 has a shoulder engaged by the toothed portion 366 of the spring 364, so that this shoulder acts as a stop limiting the movement of the toothed portion 368 beneath the springy tooth 366. It is only when the ring 370 is turned manually with respect to the ring 353, in a manner described below, that the teeth 368 move beneath the springy tooth 366, and the force of the spring 379 is such that while it maintains the tooth 366 in engagement with the shoulder at the right end of the teeth 368, as viewed in FIG. 16, the spring 379 cannot move the springy tooth 366 onto the teeth 368. Thus, the ring 370 will turn with the ring 353 and the unillustrated pin which is fixed to the ring 370 and extends the cutout 376 of the member 301 will act on the diaphragm so as to reduce the size of the exposure aperture, assuming that the camera has been set so as to have the largest exposure aperture when the parts are in their position of rest.

During this reduction in the size of the exposure aperture the rod 340 will simply move along the guide slot 343 as well as along the slot 352*b* of the ring 354 without turning the latter. Assuming that the lighting conditions are such that when the smallest exposure aperture is reached it is still necessary to reduce the amount of light reaching the film for making a proper exposure, then the exposure time will be reduced. At the instant when the ring 370 has reached the angular position which provides the smallest exposure aperture the rod 340 will have reached the stop 358 at the end of the slot 352*b*, and now the continued turning of the ring 337 with the member 301 will cause the rod 340 to act through the stop 358 on the ring 354 for turning the latter, and the ring 371 will of course turn with the ring 354 so that the camming edge 377 acts on the pin 378 to reduce the exposure time. Here again the spring 380 maintains the springy tooth 367 in engagement with a shoulder at the right end of the teeth 369, as viewed in FIG. 16, and the spring 380 is not strong enough to move the teeth 369 beneath the spring 367, so that at this time the ring 371 simply turns together with the ring 354 so as to reduce the exposure time. It should be noted that the length of the slot 343 is considerably longer than that of the slot 352*b* so that it is possible for the rod 340 to turn within the slot 343 without engaging the end of the latter through an angle which corresponds to the sum of the maximum angles through which the exposure time setting means and the exposure aperture setting means can turn. In the same way, in FIG. 13 the slot 213 is considerably longer than the slot 220*b*, and in fact the length of the slot 213 is equal to the sum of the lengths of the slots 219*b* and 220*b*, and the slot 214 has the same length. In the same way, with FIG. 16 the slot 343 has a length equal to the sum of the lengths of the slots 351*b* and 352*b*, and the same is true of the upper guide slot 344.

In the above-described manner the structure of FIG. 16 will cause the exposure time to be reduced after the minimum exposure aperture has been reached, and when the operator has moved the finger piece 308 downwardly to an end position determined, for example, by the edge of the cutout in the front wall 307 of the camera through which the arm which carries the finger piece 308 extend, and when the operator has held the finger piece 308 in its lower end position for a moment or two the operator will know that the camera components have had an opportunity to automatically set themselves, and then the operator will depress the plunger 402 to make the exposure. Of course, where the camera in its rest position provides maximum exposure time and maximum exposure aperture the selector 347 when placed with the symbol I in alignment with the index 396 will provide the greatest possible depth of field as is apparent from the above description.

Upon release of the finger piece 308, after the plunger 402 has been depressed and released, the return spring 309 will raise the member 306 so that it acts on the pin 303 to return the member 301 to its rest position, and this return of the member 301 to its rest position will of course tension the drive spring 304. In addition the member 312 will return to its starting position compressing the spring 320 and moving the movable jaw 319 away from the edge 324 so as to release the pointer 325 for turning movement. Also, the spring 335 will act to maintain the pin 334 in engagement with the extension 317 so that the projection 333*a* of the scanning member 333 will move away from the pointer 325. The spring 363 will act on the ring 353 to return the latter to its starting position where the upper end of the notch 362, as viewed in FIG. 16 engages the unillustrated projection of the tube 338 which corresponds to the projection 360, and of course the spring 361 will act on the ring 354 to return the latter to its starting position where the end 359*a* of the notch 359 engages the stop projection 360. It should be noted that when the rod 340 moves into engagement with the stop 358 at the end of the slot 352*b*, under the conditions described above, so as to produce a lesser exposure time during the continued turning of the member 337, the rod 340 still acts on the stop 355*a* so as to continue the turning of the ring 353. Since the ring 370 cannot continue to turn at this time as much as the smallest exposure aperture of the diaphragm has been reached, the springy tooth 366 simply slides along the exterior periphery of the plate 370 away from the shoulder at the end of the row of teeth 368, and when the parts are released to the spring 309 so as to be returned to their starting position the springs 379 and 363 will both act initially on the ring 353 to return the tooth 366 to the position shown in FIG. 16 and then the rings 370 and 353 will turn as a unit under the influence of the spring 363 until the exposure aperture setting means reaches its rest position.

In order to provide a different type of automatic operation the operator need only place the symbol II or the symbol III in alignment with the index 396 as shown in FIG. 17. Placing of the symbol II in alignment with the index 396 will cause the camming edge 348 to act on the rod 340 so as to place it at the same radial distance from the optical axis as the guide slot 344, so that at this time when the finger piece 308 is depressed the rod 340 will move along the slot 351*b* of the ring 353 without turning the latter since this slot 351*b* is at the same radial distance from the optical axis of the guide slot 344, and at this time the rod 340 will engage the edge 357 of the slot 352 so as to turn the ring 354 and thus act on the ring 371 to reduce the exposure time. Of course, when the smallest exposure time is reached the rod 340 will engage the stop 356 at the end of the slot 351*b* so that the continued turning of the drive means 301, 337 will now act through the motion transmitting member 340 to cause the exposure aperture to be reduced, and at this time the continued turning of the ring 354 will cause the spring 380 to become tensioned while the tooth 367 moves along the exterior periphery of the ring 371 away from the teeth 369. Here again after the parts have had an opportunity to automatically set themselves the operator will depress the plunger 402 to make the exposure, and then the operator will release the finger piece 308 so that the spring 309 can return the parts to their rest position, and of course the springs 363 and 361 will also act on the rings 353 and 354 to return the latter to their starting position, as described above.

To provide the third type of automatic operation the operator will place the symbol III in alignment with the index 396, and this will locate the rod 340 at the elevation of the left end of the slot 345 whose slope is opposite to the slopes of the concentric slots 343 and 344, so that now when the finger piece 308 is depressed just prior to making an exposure the rod 340 will move along the slot 345 and will act simultaneously on the edges 355 and 357 of the slots 351 and 352 so as to simultaneously reduce the exposure time and the exposure aperture, and of course because of the slope of the slot 345 the exposure time setting means and the exposure aperture setting means will both turn through a lesser angle than the drive means 301, 337 which together with the rod 340 forms the operating means of the embodiment of FIG. 16. The curvature of the slot 345 is such that the exposure time setting means 354, 371 and the exposure aperture setting means 353, 370 will both turn through one-half the angle that the drive 301, 337 turns through, and this will provide at all times a product of aperture and exposure time values which is equal to the light value measured by the photocell and indicated at the galvanometer as well as by the angular position of the ring 301.

In the event that it is desired to operate the camera manually, the operator will turn the ring 347 until the symbol H is aligned with the index 396. It should be noted that when the ring 347 is in the position aligning the symbol I with the index 396, the angular position of the member 347 corresponds to the angular position of the member 215 shown in FIG. 13, and it will be noted that while in FIG. 13 in this position of the parts the right end of the cutout 216 is located close to the motion transmitting rod 210, in FIG. 16 where the parts are shown positioned to provide the same type of operation the cutout 346 extends to the right through a considerable distance beyond the rod 340 so that the member 347 can be freely turned in a counterclockwise direction, as viewed in FIG. 16, to align the symbol H with the index 396 without any interference by engagement of the rod 340 with the end of the cutout 346. During all of the above-described types of automatic operation the upper portion of the camming edge 383*a* of the slot 383 has maintained the lock rod 382 in opposition to the spring 403 at a position spaced from the rings so as not to interfere in any way with the operation thereof. However, when the ring 347 is turned by the operator to the position provided for manual operation the portion 383*b* of the camming edge moves into engagement with the rod 382, and this portion 383*b* gradually approaches the optical axis so that the spring 403 moves the rod 382 in the direction of the arrow *d* of FIG. 16 into the several notches 385, 384, and 386. By extending into the notches 385 and 386 the lock rod 382 locks the rings 353 and 354, respectively, against turning movement. In addition the rod 382 moves into the notch 305*b* so as to lock the member 306 against movement by the operator. At the same time the lock rod 382 has moved through the passages 387 and 388 into the slots 389 and 390 of the rings 370 and 371, so that these rings are free to turn. Moreover, the turning of the ring 347 to the position aligning the symbol H with the index 396 has turned the cover strips 400 and 401 so that they uncover the knurled portions 372 and 374 of the rings 370 and 371. The operator can now turn the rings 370 and 371 manually to provide any desired combination of exposure aperture and exposure time, respectively, and the scale 373 will be aligned by the operator with the index 398 while the scale 375 will be aligned by the operator with the index 399. During this turning of the rings 370 and 371 the teeth 368 will turn with respect to the springy tooth 366 so that the latter will maintain the ring 370 in the position to which it has been turned by the operator to provide the desired exposure aperture, and in the same way the turning of the ring 371 will move the teeth 369 with respect to the springy tooth 367 so that the latter will cooperate with the teeth 369 to maintain the ring 371 in the angular position providing the desired exposure time. Of course the springs 379 and 380 will have no influence in determining the position of the rings 370 and 371, respectively, at this time. In order to set the structure again for automatic operation the operator simply returns the rings 370 and 371 to their starting positions. The operator, in order to return the rings 370 and 371 to their starting positions will simply manually turn these rings until the scales 373 and 375 have their values which respectively correspond to the largest exposure aperture and the longest exposure time aligned with the indexes 398 and 399, respectively. At this time the springy teeth 366 and 367 will have engaged the shoulders at the right ends of the toothed portions 368 and 369, as viewed in FIG. 16, respectively, and the operator may now turn the ring 347 to the desired type of automatic operation so as to produce any of the types of operation described above.

In practice the longest exposure time which can be provided under automatic operation is $\frac{1}{30}$ of a second, and in this event the operator would return the ring 371 to the position where the graduation 30 of the scale 375 is aligned with the index 399, as is indicated in FIG. 17. However, with the structure of FIG. 16 it is possible during manual operation to provide longer exposure times than are provided with the automatically operating structure, and for this purpose the ring 371 would of course be turned in that direction which further tensions the spring 380 and moves the teeth 369 beyond the springy tooth 367 which engages the smooth periphery of the ring 371 at this time. However, during this turning of the ring 371 manually to provide exposure times longer than $\frac{1}{30}$ of a second the lower part 390*b* of the slot 390 turns to receive the front end of the lock rod 382, and the position of the toothed edge 391 with respect to the optical axis is such that the spring 403 acts on the lock rod 382 at this time to maintain it in engagement with the teeth of the toothed edge 391 for yieldably maintaining the ring 371 in the angular position to which it has been turned by the operator to provide exposure times longer than those obtainable with automatic operation.

Of course, when the rings 370 and 371 are manually turned to their starting positions providing the largest aperture and the longest exposure time obtainable under automatic operating conditions, the passages 387 and 388 will again be aligned with the rod 382 so that when the ring 347 is manually turned to provide automatic operation the camming edge 383*a* will engage the rod 382 to move the latter in opposition to the spring 403 out through the passages 387 and 388 and out of the notches 385 and 386 as well as the notch 384 and the notch 305*b*, so that all of the parts which were previously locked by the rod 382 are now released for operation.

Figure 18:
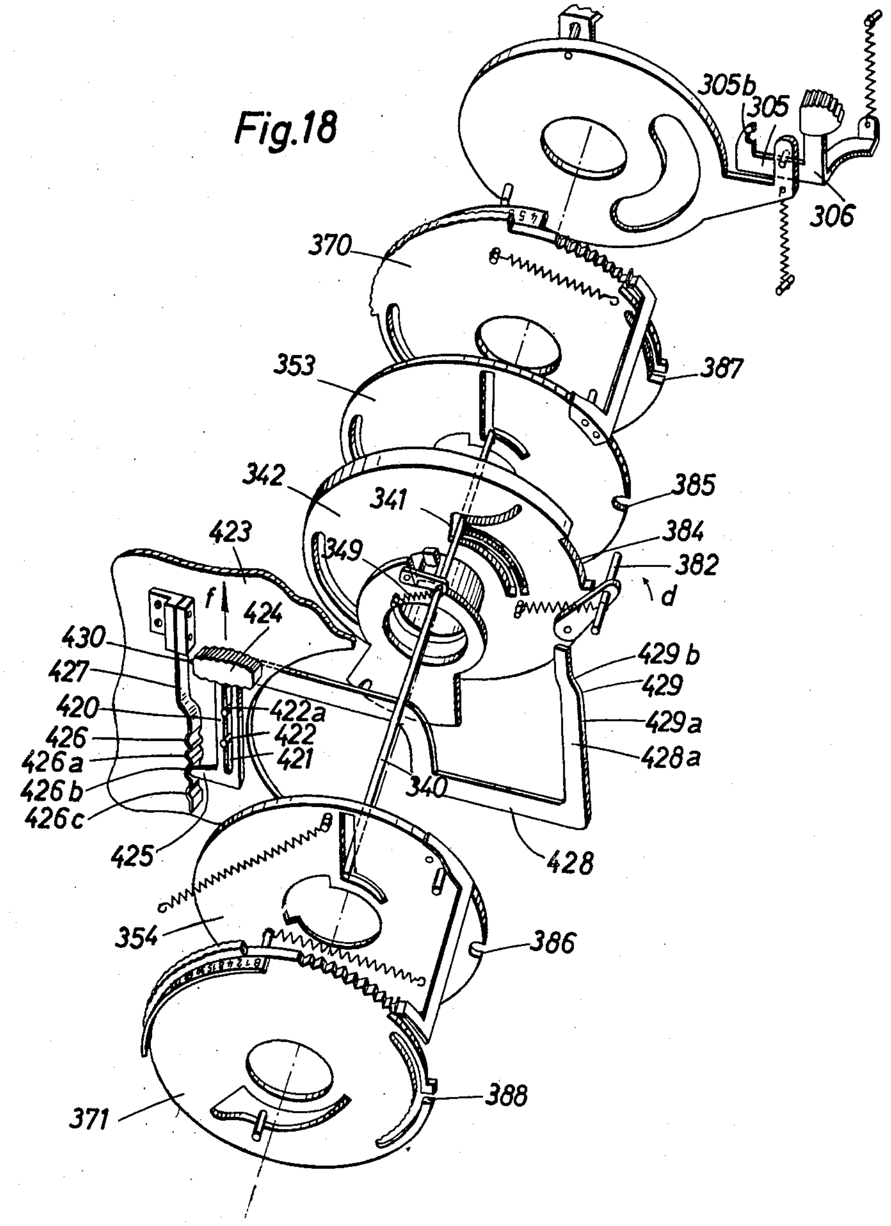
FIG. 18 is an exploded perspective illustration of a still further embodiment of a structure according to the present invention.

The embodiment of the invention which is illustrated in FIG. 18 is identical with that of FIG. 16 with the exception of the construction of the manually operable selecting means. It will be seen that the manually operable selecting means of FIG. 18 is similar to that of FIG. 14. Thus, the camera includes a stationary wall 423 which carries a bracket to which is fastened a leaf spring 427 provided with, in this case, four depressions 426, 426*a*, 426*b* and 426*c*. A manually operable slide member 420 is guided for vertical movement upwardly in the direction of the arrow *f* of FIG. 18 and of course downwardly in the opposite direction, and it will be noted that this direction of movement is substantially parallel to the general direction in which the leaf spring 427 extends. For the purpose of guiding the slide 420 the latter is formed with an elongated slot 421 which receives the stationary pins 422 and 422*a* which are fixed to the wall 423, so that in this way the slide 420 is guided for linear movement, and at its upper end the slide 420 carries a finger piece 424 which is accessible at the exterior of the camera and which carries an index 430 adapted to be aligned with scale having graduations which indicate the positions of the slide 420 for providing various types of automatic operation as well as manual operation. Thus, the lower end of the slide 420 carries the projection 425 adapted to be selectively placed in one of the depressions of the spring 427, and the upper three depressions of the spring 427, namely, the depressions 426*b*, 426*a* and 426 respectively correspond to the positions I, II, and III described above in connection with FIG. 16. The slide 420 is fixed with an arm 428 which extends beneath the motion transmitting rod 340 so that movement of the slide 420 to its various positions will control the position of the rod 340 which is maintained in engagement with the arm 428 by the spring 349. Thus, it is apparent that placing of the projection 425 in any one of the upper three depressions of the spring 427 will provide the different types of automatic operation referred to above. During the time that the projection 425 is in any one of the upper three depressions of the spring 427, the lock rod 382 is maintained in engagement with the outer lower edge portion 429*a* of the upwardly directed end portion 428*a* of the arm 428. This lower portion 429*a* of the outer edge 429 of the end portion 428*a* maintains the rod 382 out of the recesses 385 and 386 as well as the recess 305*b*, and of course beyond the passages 387 and 388.

When it is desired to provide manual operation with the embodiment of FIG. 18 the operator will move the finger piece 424 downwardly in a direction opposite to that indicated by the arrow *f*, and this will locate the projection 425 in the lowermost projection 426*c*. This will cause the upper portion 429*b* of the edge 429 to move downwardly into engagement with the lock rod 382, and since the upper edge 429*b* is displaced to the left with respect to the lower edge portion 429*a*, as viewed in FIG. 18, the lock rod 382 will turn into the lock notches 385, 386, and 305*b*, and through the passages 387 and 388 into the arcuate slots of the rings 370 and 371, respectively, to provide the manual operation exactly as described above in connection with FIG. 16.

Figures 19, 20, 21:
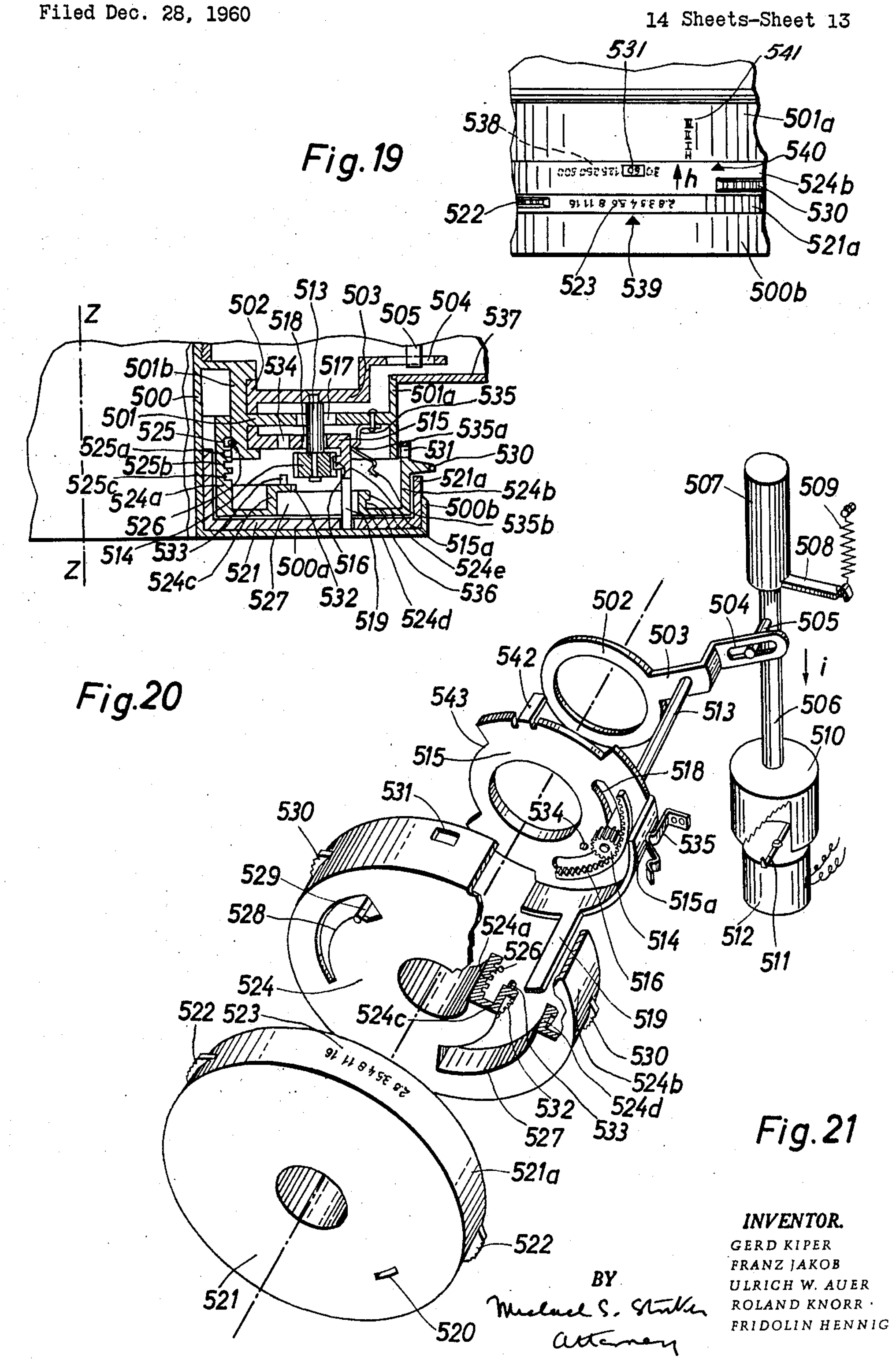
FIG. 19 is a fragmentary top plan view of part of an objective assembly showing adjusting structure of a further embodiment of the present invention.
FIG. 20 is a sectional view on an enlarged scale taken in a plane which includes the optical axis and showing the details of the structure of the embodiment of FIG. 19.
FIG. 21 is a perspective exploded view of the structure of FIGS. 19 and 20.

The embodiment of the invention which is illustrated in FIGS. 19–21 includes an exposure time setting means and an exposure aperture setting means which are interconnected by a differential transmission which forms part of the operating means of this embodiment. Referring to FIG. 20, it will be seen that the structure includes a central stationary tube 500 which is coaxially arranged with respect to the optical axis Z—Z, and fixed to the tube 500 is a disc 501 which is fixed at its inner end to a sleeve 501*b*, this latter sleeve being fixed to the interior tube 500 in the manner shown in FIG. 20. The sleeve 501*b* turnably supports for rotary movement about the optical axis Z—Z a ring 502 which fixedly carries a lever 503 which extends radially from the ring 502 and which is stepped as indicated in FIGS. 20 and 21. The outer free end portion of the lever 503 is formed with a longitudinal slot 504 which receives a pin 505 fixed to an actuating rod 506 which extends upwardly into a cap 507 which corresponds to the cap 15 of FIG. 1 and in which is located a spring identical with the spring 16. The cap 507 is fixed with an arm 508 to which a return spring 509 corresponding to the spring 28 of FIG. 1 is connected. At its bottom end the rod 506 carries a hollow scanning member 510 identical with the scanning member 18 of FIG. 1 and cooperating with the two-armed pointer 511 of the galvanometer 512. The structure which actuates the lever 503 in response to manual depression of the cap 507 to place the lever 503 at an angle indicative of the lighting conditions before an exposure is made is identical with that of FIG. 1 fully described above.

The lever 503 fixedly carries a pin 513 which extends parallel to the optical axis and which supports for free rotation at its end, which is distant from the lever 503, a pinion 514. The sleeve 501*b* also supports for rotary movement about the optical axis a diaphragm adjusting ring 515 which carries an axially extending annular flange provided at its inner surface with the gear teeth 516 which mesh with the pinion 514. The pin 513 extends through an arcuate slot 517 formed in the stationary disc 501 as well as through a slot 518 formed in the exposure aperture setting means 515. The width of the slots 517 and 518 is greater than the diameter of the pin 513 while the arcuate length of each of the slots 517 and 518 is at least equal to the maximum angle through which the lever 503 can turn. The aperture setting ring 515 also fixedly carries a forwardly extending arm 519 which extends parallel to the optical axis and a rearwardly extending arm 542 which also extends parallel to the optical axis. The arm 519 extends into an opening 520 formed in a rotary diaphragm adjusting ring 521 which is supported for turning movement by the inner tube 500, while the arm 542 serves to connect the ring 515 with an unillustrated blade adjusting ring of an iris diaphragm. The inner stationary tube 500 terminates at its front end in an annular wall 500*a* in a plane normal to the optical axis, and rearwardly directed annular flange 500*b* is fixed with the outer periphery of the annular wall 500*a*. The flange 500*b* surrounds the manually operable diaphragm adjusting ring 521, and this latter ring includes an interior flange which slidably surrounds the tube 500 as well as an exterior flange 521*a* which extends rearwardly beyond the flange 500*b* so as to leave the finger pieces 522 exposed and so as to render the scale 523 of aperture values visible.

Between the diaphragm setting ring 515 and the manually operable diaphragm adjusting ring 521 there is located next to and supported on the inner surface of the sleeve 501*b* a manually operable means 524 for selecting the particular type of operation desired. The selecting ring 524 has an inner tubular portion 524*a* extending into and slidably overlapping the tubular portion 501*b*, and the inner surface of the tubular sleeve 501*b* is formed with an annular groove receiving a springy split ring 526 which is adapted to be selectively located in one of the four exterior grooves 525, 525*a*, 525*b*, 525*c* formed in the exterior of the tubular portion 524*a*, so that in this way the manually operable selecting means 524 is axially shiftable to one of four axial positions in which it is releasably held by cooperation of the split ring 526 with one of these grooves at the exterior of the tubular portion 524*a*. The front annular wall of the selecting member 524 is formed with an arcuate cutout through which the arm 519 of the diaphragm setting ring 515 extends into the opening 520. The selecting means 524 is also formed at its front annular wall with a cutout providing along its lower edge, as viewed in FIG. 21, the exposure time setting cam 528, this camming edge 528 cooperating with a pin 529 of a conventional exposure time setting structure located behind the ring 502. The pin 529 of the exposure time setting structure extends through the arcuate notch 543 formed in the ring 515 to a between-the-lens shutter located behind the ring 502 and the pin 529 cooperates with the exposure time controlling structure of this conventional shutter construction. The manually operable selecting means 524 includes an exterior rearwardly extending flange 524*b* which carries a pair of finger pieces 530 and which is formed with a window 531.

The manually operable selecting means 524, which also forms at a portion thereof the exposure time setting means, is provided between its inner tubular flange 524*a* and its outer flange 524*b* with a pair of arcuate portions 524*c* and 524*d* extending rearwardly from the front annular wall of the selecting means 524 and located along the edges of the cutout 527. These rearwardly extending portions 524*c* and 524*d* extend along arcs of circles whose centers are both located in the optical axis, and the portion 524*c* fixedly carries the gear teeth 532 as well as the lock pin 533. When the selecting means 524 is moved rearwardly from the position thereof shown in FIG. 20 the teeth 532 will come into engagement with the pinion 514, while when the selecting means 524 is moved rearwardly even further the lock pin 533 will move into the opening 534 which is formed in the diaphragm setting ring 515.

The stationary supporting disc 501 fixedly carries a leaf spring 535 which forms a brake, and this spring 535 is bent in the manner indicated most clearly in FIGS. 20 and 21 so as to have a pair of braking portions 535*a* and 535*b*. In the position of the parts shown in FIG. 20 the portion 535*a* of the brake spring 535 presses against the exterior surface 515*a* of the diaphragm adjusting ring 515 so as to resist rotary movement of this ring. The portion 535*b* is so arranged that when the selecting means 524 is shifted so that the split ring 526 is located in the groove 525*b*, this portion 535*b* of the brake spring will press against the exterior surface portion 524*e* of the rearwardly extending flange 524*d* of the selecting means 524. When the selecting means 524 is moved still further inwardly so as to locate the split ring 526 in the groove 524*a*, the projection 535*b* will be located in the groove 536 which is located at the exterior of the flange 524*d*, as indicated in FIG. 20.

The stationary disc 501 fixedly carries at its outer periphery a tubular member 501*a* which is fixed to and extends forwardly from the front wall 537 of the camera. This tubular portion 501*a* is partly overlapped by the exterior flange 524*b* of the manually operable means 524 and carries in the annular region of the window 531 a scale 538 of exposure times, as indicated in FIG. 19. The graduations of the scale 538 are so arranged that only one exposure time will appear through the window 531 at the different angular positions of the means 524 which can be turned angularly to adjust the exposure time. Moreover, the outer flange 500*b* of the inner tube 500 carries an index 539 which cooperates with the graduations of the aperture scale 523. In addition, the outer flange 524*b* of the selecting means 524 carries an index 540 which cooperates with a scale 541 on the exterior surface of the tube 501*a* to indicate the axial position of the means 524 which will provide the desired type of operation, and it will be noted that the scale 541 extends parallel to the optical axis.

With the parts in the position shown in FIGS. 19–21 it is possible for the operator to adjust the exposure time and the exposure aperture manually. Thus, the operator may engage the finger pieces 522 of the ring 521 for turning the latter until the desired value of the scale 523 is aligned with the index 539. The operator engages the finger pieces 530 to turn the element 524 so as to adjust the exposure time and the ring 524 is turned at this time until the desired value of the exposure time appears in the window 531. Of course, rotary movement of the ring 524 will result in movement of the camming edge 528 so as to adjust the position of the ring 529 and thus adjust the exposure time, while rotary movement of the ring 515 in response to manual turning of the ring 521 causes the projection 542 to act on the diaphragm so as to adjust the latter.

In order to set the structure for automatic operation the diaphragm adjusting ring 521 is manually turned until the starting diaphragm value of the automatic operation is aligned with the index 539, and where when the parts are at rest and set for automatic operation the diaphragm is set to provide the largest exposure aperture the scale will be positioned so that the value corresponding to the largest exposure aperture will be aligned with the index 539. The ring 524 is turned until the index 540 at the exterior surface of the exterior flange 524*b* is aligned with the axially extending scale 541 which indicates the various types of automatic operation. With the ring 524 thus angularly positioned so that the index 540 is aligned with the axial scale 541, this ring 524 is axially shifted by the operator in the direction of the arrow *h* shown in FIG. 19.

If the ring 524 is shifted inwardly until the index 540 is aligned with the symbol I of the scale 541, then the split ring 526 has been displaced out of the groove 525 and has entered into the groove 525*a*. This axial movement of the selecting means 524 has caused the gear teeth 532 to move into mesh with the pinion 514. Now when the cap 507 is manually depressed the rod 506 will move down in the direction of the arrow *i* shown in FIG. 21 until the scanning member 510 engages the galvanometer pointer 511, and thus the lever 503 has been turned through an angle corresponding to the lighting conditions.

The rotary movement of the lever 503 about the optical axis of course also results in turning of the pinion 514 in its entirety about the optical axis, and since the diaphragm setting means 515 is pressed against by the brake spring 535, the diaphragm will not be adjusted during the initial part of the downward movement of the lever 503 and thus the pinion 514 will act only to turn the gear 532 and of course the ring 524 so as to turn the camming edge 528 and adjust the exposure time. In the event that so much light is available that at the shortest exposure time it is still necessary to reduce the exposure, the ring 524 will remain stationary at the end of its turning movement which provides the shortest exposure time, for example as a result of engagement of the pin 529 with the end of the camming edge 528. At this time, since the gear teeth 532 are held stationary, the pinion 514 can only roll along the gear teeth 532 and will therefore act on the diaphragm adjusting ring 515 through the teeth 516 thereof to turn the ring 515 in opposition to the force of friction provided by the brake spring 535, and thus the exposure aperture will now start to diminish. Of course, this operation continues until the scanning member 510 engages the galvanometer pointer 511. Thus, the exterior surface 515*a* will at this time slip with respect to the brake spring. Of course, continued downward movement of the cap 507 after the scanning member 510 engages the galvanometer 511 will only result in compression of the spring within the cap member 507 and in subsequent release of the shutter, as was described above in connection with FIG. 1.

Upon release of the manually engageable cap member, cap member 501, the return spring 509 returns the parts to their rest position in a direction opposite to that indicated by the arrow *i*. In this way the rod 506 acts on the lever 503 to return the latter to its starting position and through the differential drive 514, 516, 532 the exposure aperture setting ring 515 and the exposure time setting ring 524 are returned to their original positions.

Assuming that with the above-described structure of FIGS. 19–21 the largest aperture and longest exposure time are provided when the parts are at rest, then it is clear that with the index 540 aligned with the symbol I the structure will provide the best possible exposure for a rapidly moving subject, inasmuch as the exposure aperture does not start to reduce until after the minimum exposure time has been reached.

By shifting the manually operable selecting means 524 inwardly until the index 540 is aligned with the symbol II, the split ring 526 moves into the groove 525*b*, and at the same time the portion 535*b* of the brake spring is engaged by the surface 524*e* of the ring 524. The axial shifting of the ring 524 so as to place its surface 524*e* in engagement with the portion 535*b* of the leaf spring 535 moves this leaf spring radially away from the optical axis so as to raise the portion 535*a* away from the exterior surface of the flange of the exposure aperture setting ring 515, and thus the brake at this time acts only on the exposure time setting means and not on the exposure aperture setting means.

Now when the operator depresses the cap 507 so as to make an exposure in the manner described above, the turning arm 503 will cause the pinion 514 to ride along the teeth of the gear portion 532 while turning the ring 515 through its teeth 516. Only if there is so much light available that the lever 503 continues to turn after the smallest exposure aperture has been provided does the ring 515 stop turning so that the continued rotary movement of the lever 503 will cause the pinion 514 to overcome the force of friction of the brake spring and turn the ring 524 so as to reduce the exposure time. It is clear that with the selecting means 524 placed so as to have its index 540 aligned with the symbol II, the greatest possible depth of field will be provided since the exposure aperture is reduced to its smallest size before the exposure time is reduced.

When the selecting means 524 is shifted inwardly so that the index 540 is aligned with the symbol III, then the split ring 526 enters into the last groove 525*c* and at the same time the lock pin 533 enters into the opening 534. Thus, the diaphragm adjusting ring 515 and the ring 524 which serves to adjust the exposure time are fixedly connected to each other. At the same time the portion 535*b* of the brake spring 535 has entered into the groove 536. The arrangement of this groove is such that in this position of the parts the braking force of the spring 535 is distributed substantially uniformly between the diaphragm adjusting ring 515 and the ring 524.

When the parts are in this position and an exposure is made by manually depressing the cap 507, the turning lever 503 will simply act through the pinion 514 on the rings 515 and 524 to turn both of these rings simultaneously with the lever 503 to exactly the same angle, and thus this type of operation will provide combinations of exposure time and exposure aperture which make it possible to provide photographs of moving subjects without sacrificing the benefits of a substantial depth of field.

Figure 22:
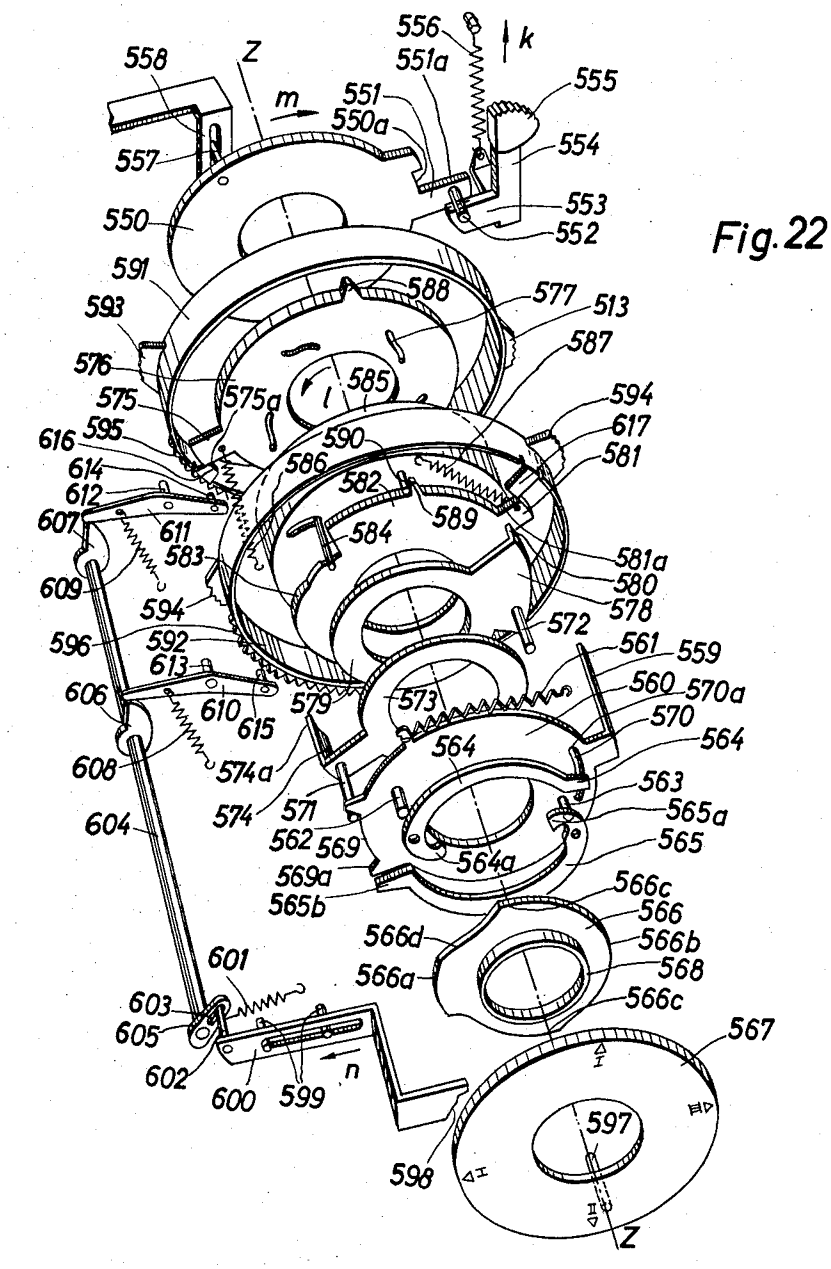
FIG. 22 is an exploded perspective view of yet another embodiment of a structure according to the present invention, FIG. 22 showing an embodiment which includes a detent means for use when the structure is manually operated.

The embodiment of the invention which is illustrated in FIG. 22 is similar to that of FIG. 9 but in addition to accomplishing the results produced by the embodiment of FIG. 9 is capable of being manually operated. The drive means of the embodiment of FIG. 22, instead of including a single ring corresponding to the ring 150 of FIG. 9, includes a pair of rings 550 and 560 which are placed in driving engagement with each other in a manner described below. The ring 550 is supported for rotary movement about the optical axis Z—Z, and this ring 550 includes an extension 551 which fixedly carries a pin 552 which rests against an arm 553 which corresponds to the arm 149 of FIG. 9. The arm 553 is fixed to the upwardly extending member 554 which at its top end is fixed to the finger piece 555 adapted to be engaged by the operator and located at the exterior of the camera, and the return spring 556 is connected at one end to a stationary part of the camera and at its opposite end to the member 554 so as to move the latter upwardly in the direction of the arrow *k* of FIG. 22 to the illustrated rest position shown in FIG. 22.

The ring 550 in addition fixedly carries a pin 557 which extends into the bifurcated portion 558 of the scanning means which may be identical with the scanning means described above in connection with FIG. 16, and all of the structure shown in FIG. 16 cooperating with the slide member 312 may be included in the embodiment of FIG. 22 cooperating with the slide member 558 which corresponds to and operates in the same way as the slide member 312.

The other ring 560 of the drive means which forms part of the operating means of the embodiment of FIG. 22 is fixedly connected with an arm 559 which extends parallel to the optical axis rearwardly from the ring 560 toward the ring 550, and this extension 559 engages the upper edge 551*a* of the arm 551 of the ring 550. The drive spring 561 which is weaker than the spring 556 is connected at one end to a projection of the ring 560 and at its opposite end to a stationary part of the camera, and the drive spring 561 urges the extension 559 against the edge 551*a* of the arm 551. Thus, the spring 561 acts through the arm 559 on the arm 551 to maintain the pin 552 in engagement with the arm 553. When the return spring 556 returns the parts to their rest position the spring 561 is tensioned, and the rest position is determined by the movement of the scanning means 558 which is limited in its movement to the left, as viewed in FIG. 22. The same is of course true of the embodiment of FIG. 16. Thus, the member 312 can only move to the left, as viewed in FIG. 16 to the position illustrated since the movable jaw 319 is limited in its movement to the left, as viewed in FIG. 16, and thus it is the member 312 of FIG. 16 and the member 558 of FIG. 22 which determines the rest position of the parts under the influence of the return springs 309 and 556, respectively.

The ring 560 fixedly carries the pivot pins 562 and 563 which respectively pivotally support the motion transmitting members 564 and 565 which respectively correspond to the motion transmitting members 156 and 157 of the embodiment of FIG. 9. Thus, the motion transmitting members 564 and 565 are each in the form of a substantially semi-circular two-armed lever. The members 564 and 565 are respectively provided with the cam follower portions 564*a* and 565*a*, and these cam follower portions cooperate with the cam 566 which corresponds to the cam 158 and which has the same configuration as the cam 158. The cam 566 is fixed to a tubular member 568 which is freely turnable about the optical axis and which is also fixedly connected with the manally engageable ring 567 which forms the manually engageable selecting means for turning the cam 566 to a desired angular position which will provide a desired type of operation. The free ends 564*b* and 565*b* of the motion transmitting levers 564 and 565 respectively cooperate with the pins 572 and 571 for bringing about actuation of the exposure setting means and the exposure aperture setting means in a manner similar to the structure of the embodiment of FIG. 9.

The pin 571 is fixed to an intermediate ring 573 which corresponds to the ring 170 of FIG. 9 and which is freely turnable about the optical axis. The ring 573 carries an axially extending projection 574 whose edge 574*a* engages the edge 575*a* of a projection 575 of the aperture setting ring 576. This ring 576 is formed with the camming slots 577 which control the blades of the diaphragm in a well-known manner, this diaphragm not being shown for the sake of clarity and being conventional. The diaphragm has its blades located within the housing 585 which also serves to house the shutter.

The pin 572 is carried by the radial projection 578 of an intermediate ring 579 which is supported for rotary movement about the optical axis, and this intermediate ring 579 carries at the outer end of the radial projection 578 an axial rearwardly extending projection 580 which cooperates with the projection 581 of a rotary exposure time adjusting ring 582. Thus, the rings 579 and 582 form the exposure time setting means of the embodiment of FIG. 22, and the lower edge of the axial projection 580 engages the upper edge 581*a* of the radial projection 581 of the ring 582 so that when the ring 579 is turned in the direction of the arrow *m* of FIG. 22 the rotary movement of the ring 579 will be transmitted to the ring 582. This ring 582 is provided with a camming edge 583 which controls the exposure time and which cooperates with a control pin 584 for this purpose, this pin 584 extending through a slot into the housing 585 to act on the conventional time controlling structure therein.

A spring 587 is connected at one end to the housing 585 and at its opposite end to the projection 581 so as to yieldably maintain the projection 589 of the exposure time setting ring 582 in engagement with the stop pin 590 which is fixedly carried by the housing 585, so as to determine the rest position of the exposure time setting means, and in the same way a spring 586 acts on the projection 575 of the diaphragm adjusting ring 576 to maintain the projection 588 of the ring 576 in engagement with another pin 590 also fixed to the housing 585 so as to determine the rest position of the diaphragm setting means. The end of the spring 586 distant from the projection 575 may also be fixed to the housing 585, and for the sake of clarity the second pin 590 which is engaged by the projection 588 is not shown in FIG. 22. Thus, the springs 587 and 586 respectively urge the rings 582 and 576 in the direction of the arrow *l* of FIG. 22.

A manually operable diaphragm adjusting ring 591 concentrically surrounds the diaphragm setting ring 576 and is provided with finger pieces 593 so that the operator may turn the ring 591 for the purpose of manually setting the diaphragm in a manner described below, and the ring 591 also is provided with a row of teeth 595 which form part of a detent structure for holding the ring 591 in its adjusted position. In the same way a manually turnable ring 592 concentrically surrounds the exposure time setting ring 582 and is provided with finger pieces 594 adapted to be engaged by the operator for the purpose of manually turning the ring 592 when the exposure time is manually set, and the ring 592 is also provided with teeth 596 which form part of a detent structure. The manually turnable rings 591 and 592 are respectively provided with inwardly directed radial projections 616 and 617 which respectively engage the projections 575 and 581 at their edges 575*a* and 581*a*, and it will be seen that the springs 586 and 587 maintain the edges 575*a* and 581*a* respectively in engagement with the projections 616 and 617. The manually operable selecting ring 567 carries a pin 597 which extends parallel to the optical axis and which cooperates with a camming edge 598 at one end of a stepped slide 600 which is movable in the direction of the narrow *n* as well as in the opposite direction and which is formed with a longitudinal slot receiving the stationary pins 599 which guide the slide 600 for movement. The slide 600 is acted upon by a spring 601 connected at one end to a stationary part of the camera and at its opposite end to a pin 602 which is fixed to the slide 600, and this spring 601 urges the slide 600 to the position shown in FIG. 22 where the left pin 599 is in engagement with the left end of the longitudinal slot of the slide 600, and in this position the camming edge 598 is in the path of movement of the pin 597. The pin 602 extends into a longitudinal slot 603 formed in a lever 605 which is fixed to a camshaft 604 supported for rotary movement about its axis, and the lever 605 extends radially from the camshaft 604. The rotary camshaft 604 extends parallel to the optical axis, is supported for rotary movement by stationary bearings which are not shown for the sake of clarity, and fixedly carries a pair of cams 606 and 607 which respectively engage a pair of two-armed levers 610 and 611. The levers 610 and 611 are supported for turning movement intermediate their ends by stationary pivot pins 613 and 612, respectively, and a pair of springs 608 and 609 are respectively connected at their lower ends to stationary parts of the camera and are respectively connected at their upper ends, as viewed in FIG. 22, to the levers 610 and 611 so as to maintain the latter in engagement with the cams 606 and 607, respectively. The levers 610 and 611 fixedly carry at their ends distant from the cams 606 and 607 pins 615 and 616 which are adapted to cooperate respectively with the teeth 596 and 595. In the position of the parts shown in FIG. 22 the cams 506 and 507 maintain the levers 610 and 611 respectively at angular positions where the detent pins 615 and 616 are located beyond and cannot cooperate with the teeth 596 and 595 of the manually turnable rings 592 and 591.

In the position of the parts shown in FIG. 22, the camming portion 566*a* of the cam 566 engages the cam follower portion 564*a* of the motion transmitting member 564 so that the free end of this latter motion transmitting member engages the pin 572. At the same time the motion transmitting member 565 simply rests loosely with its cam follower portion 565*a* against the cam 566, so that at this time the motion transmitting member 565 does not engage the pin 571.

When the operator depresses the finger piece 555 the spring 561 will turn the ring 560 and through the arm 559 the ring 550 in the direction of the arrow *m* until the slide 558 of the scanning means cannot move further so that the angular position to which the rings 550 and 560 are turned by the spring 561 is determined by the lighting conditions. The turning of the ring 560 causes the motion transmitting member 564 to act through the pin 572 on the intermediate ring 579 which in turn acts through the projection 580 on the projection 581 of the ring 582 for setting the exposure time, the camming edge 583 turning with respect to the pin 584 so as to move the latter and adjust the exposure time. If so much light is available that the exposure time setting means reaches the end of its range of movement, then at this instant the cam follower portion 564*a* of the motion transmitting lever 564 reaches the end of the camming portion 566*a* and moves on to a camming portion 566*d* of the cam 566. The camming portion 566*d* has the curvature of an Archimedan spiral and the result is that the free end of the motion transmitting member 564 which engages the pin 572 simply slips along this pin without turning the latter while the cam follower portion 564*a* moves along the camming portion 566*b*, so that the exposure time remains at its minimum value, and simultaneously with the engagement of the cam follower portion 564*a* with the end of the camming portion 566*a* and the beginning of the camming portion 566*d* the motion transmitting member 565 engages at its free end 565*b* the pin 571 so that during the continued turning of the ring 560 the motion transmitting member 565 turns the pin 571 and of course the ring 573 so as to cause the projection 574 to act on the diaphragm adjusting ring 576, and now the diaphragm will be adjusted. The projection 569*a* of the ring 560 engages the pin 571 simultaneously with the end 565*b* of the motion transmitting member 565 so as to augment the operation of the latter, and, if desired, the structure may be designed so that only the projection 569*a* engages the pin 571 to turn the latter under the above conditions. For this purpose the ring 560 is formed with the arcuate notch 569 through which the pin 571 extends. Also the ring 560 is formed with the arcuate slot 570 through which the pin 572 extends, and when the cam 566 is displaced through 180° from the position shown in FIG. 22 so that the camming portion 566*a* engages the follower portion 565*a* of the motion transmitting member 565 so as to produce setting of the diaphragm before setting of the exposure time, the end 570*a* of the slot 570 will engage the pin 572 at the proper moment when the end of the adjustment of the diaphragm has been reached so as to act on the pin 572 to adjust the exposure time, assuming that the lighting conditions are such that adjustment of both aperture and time are required. Of course, in this event the diameter of the cam 266 may be made so small that the motion transmitting member which is the second one to come into operation with the setting of the cam 566 does not at all have its free end engage the pins 571 or 572 and instead these pins are engaged exclusively by the projection 569*a* and the end 570*a* of the slot 570.

Assuming that in the rest position of the parts the exposure time and exposure aperture have their largest values, then with the parts having the positions shown in FIG. 22 where the camming portion 566*a* engages the cam follower portion 564*a* of the motion transmitting member 564, the structure will operate automatically to provide the best possible exposure for a moving subject since the exposure time will reach its smallest value before the exposure aperture starts to have its size reduced.

After the exposure has been made the operator releases the finger piece 555 so that the return spring 566 acts in the direction of the arrow *k* to return the parts to their rest position, and at this time the spring 556 will act through the ring 550 and the arm 559 on the ring 560 to return the latter to its starting position and to tension the spring 561, and the starting position is of course determined by the end position of the member 558 of the scanning means, as described above. At the same time the springs 586 and 587 will respectively act on the exposure aperture setting means and exposure time setting means to return both of these means to their rest positions where the projections 588 and 589 engage the stationary stop pins 590, as described above.

When it is desired to provide a different type of operation the manually turnable ring 567 is turned so as to turn the angular position of the cam 566, and by turning the ring 567 through 180° the camming portion 566*a* will be placed in engagement with the cam follower portion 565*a* of the motion transmitting member 565 so that now when the operator depresses the finger piece 555 the structure will operate in the manner described above to cause the exposure aperture first to be reduced in size and then, if necessary, the exposure time to be reduced, so that with the parts in this position the greatest possible depth of field will be provided.

It is also possible to turn the ring 567 to a third position where the camming portions 566*c* which are diametrically opposed to each other respectively engage the cam follower portions 564*a* and 565*a* of the motion transmitting members 564 and 565, respectively, so that at this time when the operator depresses the finger piece 555 the spring 561 will turn the ring 560 and both of the motion transmitting members will simultaneously act on the pins 571 and 572 so as to simultaneously reduce both the exposure time and the exposure aperture. The curvature of the cam 566 at its camming portions 566*c* is such that these camming portions gradually approach the optical axis in the direction of turning *m* of the parts, so that as a result at this time while the ring 560 turns the motion transmitting members 564 and 565 are capable of turning with respect to the ring 560, so that the exposure aperture setting ring 576 and the exposure time setting ring 582 turn through a lesser angle than the ring 560. The curvature of the camming portions 566*c* is such that the exposure aperture setting ring 576 and the exposure time setting ring 582 turns through one-half the angle that the ring 560 turns through, and with this arrangement an exposure will be made which will take into consideration the speed of movement of the subject without sacrificing the benefits of a substantial depth of field.

In the event that it is desired to operate the structure manually, the operator simply turns the ring 576 so that the pin 597 engages the camming edge 598 of the slide 600 and shifts the latter in the direction of the arrow *n*, and in this way the pin 602 will act through the lever 605 on the camshaft 604 so as to turn the latter in a counterclockwise direction, as viewed in FIG. 22, with the result that the springs 608 and 609 respectively turn the levers 610 and 611 also in counterclockwise directions, and thus the detent pins 615 and 616 will move into engagement with the teeth 596 and 595 of the manually turnable rings 592 and 591, respectively. These rings may at this time be manually turned, and they include unillustrated scales which will cooperate with suitable indexes on the camera so that the operator knows or what position to place these rings so as to provide the desired exposure time and exposure aperture. The manual turning of the ring 592 will cause its projection 617 to act through the projection 581 on the ring 582 so as to adjust the exposure time, and the pin 615 will cooperate with the teeth 596 so as to yieldably maintain the ring 592 in the position to which it has been manually turned by the operator. In much the same way the operator may turn the ring 591 at this time so that the projection 616 of this ring acts through the projection 575 on the ring 576 so as to adjust the exposure aperture, and the pin 614 will cooperate with the teeth 595 to yieldably maintain the ring 591 in its adjusted position. In this way the operator may manually set the camera to make an exposure.

If it is now desired to return to automatic operation, the operator simply turns the ring 576 to that angular position which will provide the desired type of operation, and in so doing the pin 597 will move away from the camming edge 598 so that the spring 601 will act to return the slide 600 to its rest position shown in FIG. 22. This will result in clockwise turning of the camshaft 604 so that the cams 606 and 607 act on the levers 610 and 611 to move the pins 615 and 616 beyond the range of the teeth 596 and 595, respectively, and this will result in releasing the rings 576 and 582 to the springs 586 and 587 which now act the return the rings 576 and 582 to their rest positions where the projections 588 and 589 respectively engage the stop pins 590, and at this time the projections 575 and 581 act through the projections 616 and 617 on the rings 591 and 592 to transmit the turning of the rings 576 and 582 to the rings 591 and 592 so that the latter rings also return to their rest positions.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, exposure time setting means; exposure aperture setting means; moving means coacting with both of said setting means and having at least three positions in the first of which said moving means releases at least one of said setting means for manual operation so that in said first position of said moving means the operator can manually adjust at least one of said setting means, in the second of which said moving means moves both of said setting means simultaneously, and in the third of which said moving means will move sequentially one of said setting means first and will move then the other of said setting means; and manually operable means cooperating with said moving means for selectively placing the latter in one of said three positions.

2. In a camera as recited in claim 1, said moving means including a differential means for moving said setting means sequentially, and a manually operable lock means for optionally locking said differential means to connect said moving means to both of said setting means in said second position of said moving means for moving both of said setting means simultaneously.

3. In a camera as recited in claim 1, said moving means including a differential means cooperating with both of said setting means for moving both of said setting means, a brake means cooperating with at least one of said setting means for braking the movement thereof so that the differential means will move first the other of said setting means and then said one setting means in opposition to said brake means, and manually operable lock means cooperating with said differential means for locking the same against operation so as to interconnect both of said setting means for simultaneous movement in said second position of said moving means.

4. In a camera as recited in claim 1, said moving means including a differential means cooperating with both of said setting means for moving the same, a pair of brake means respectively connected operatively with said exposure time and said exposure aperture setting means, means cooperating with said pair of brake means for alternately setting one or the other of said pair of brake means into operation so as to brake the movement of one or the other of said setting means whereby said differential means will move first the unbraked and then the braked setting means, and lock means cooperating with said differential means for optionally locking the same against operation so as to interconnect both of said setting means for movement together in said second position of said moving means.

5. In a camera as recited in claim 1, support means supporting both of said setting means for coaxial rotary movement, said moving means including a pair of differential gear portions fixed with said exposure time and exposure aperture setting means and respectively having teeth directed toward but spaced from each other, a pinion located between and meshing with both of said differential gear portions to form with the latter a differential means for moving both of said setting means, means carrying said pinion and supported by said support means for moving said pinion along a circular path coaxial with the common turning axis of both of said setting means, a lever turnably carried by said support means and having a pair of free end portions one of which moves adjacent one of said setting means when said lever is turned in one direction and the other of which moves adjacent the other of said setting means when said lever is turned in the opposite direction, and brake means respectively carried by said end portions of said lever for respectively engaging said exposure time and exposure aperture setting means alternately depending upon the direction in which said lever is turned, whereby said lever may be set to prevent turning of the selected one of said setting means until the other of said setting means has been turned through a predetermined distance by said differential means.

6. In a camera as recited in claim 1, support means, both of said setting means being supported for rotary movement about a common axis by said support means, said moving means including a differential means cooperating with both of said setting means for moving the same, a pair of stop means respectively cooperating with both of said setting means for stopping the movement thereof, and said manually operable means including a transmission means cooperating with said pair of stop means for alternately placing one or the other of said pair of stop means in a stopping position so that one or the other of said setting means will be stopped against movement, whereby said differential means will first move the setting means which is not stopped, and brake means cooperating with both of said stop means for braking the movement of whichever one of said stop means is in its stopping position, whereby the stopped setting means can be moved when acted upon with a force sufficient to overcome the resistance of said brake means.

7. In a camera as recited in claim 1, support means supporting both of said setting means for coaxial rotary movement, said moving means including a lever carried by said support means for rotary movement about the common axis of said setting means, motion transmitting means operatively connected with both of said setting means for transmitting motion thereto, connecting means connecting said motion transmitting means to said lever for turning movement with the latter about said common axis as well as for turning movement with respect to said lever about a second axis parallel to said common axis and coaxial shifting movement along said second axis, said motion transmitting means being axially shiftable to four positions in one of which said motion transmitting means cooperates with both of said setting means to transmit motion thereto while being turnable with respect to said lever, and in a second of which said motion transmitting means is connected operatively to only one of said setting means for transmitting motion thereto, and in a third of which said motion transmitting means is connected operatively only to the other of said setting means for transmitting motion thereto, and said motion transmitting means having a fourth axial position where said motion transmitting means engages both of said setting means, and said moving means also including a lock means cooperating with said lever and motion transmitting means when the latter is in said fourth position for preventing movement of said motion transmitting means about said second axis so that in said fourth position said motion transmitting means can only move with said lever about said common axis for simultaneously turning both of said setting means with said lever about said common axis in said second position of said moving means.

8. In a camera as recited in claim 1, support means, said moving means including an inner ring turnably carried by said support means for rotary movement about the axis of said ring, said inner ring having an outer peripheral portion formed with teeth and being formed adjacent said teeth with an opening, said inner ring having a predetermined rest position where said opening is located in a predetermined angular position, an outer ring coaxially surrounding said inner ring in the same plane as the latter while being spaced therefrom and said outer ring being supported by said support means for rotation about the axis of said inner ring, said outer ring having inner peripheral teeth directed toward the teeth of said inner ring and said outer ring being formed with an opening adjacent said inner teeth thereof, said outer ring having a predetermined rest position where said opening thereof is also located in a predetermined angular position, said rings being respectively connected to both of said setting means, said moving means including a lever carried by said support means for turning movement about the common axis of said rings and extend across the space therebetween, elongated shaft means carried by said lever, extending parallel to the common axis of said rings through the space therebetween and being substantially equidistant from said rings, a pinion turnably carried by said shaft means and meshing with the teeth of both of said rings so as to form therewith a differential means, a manually shiftable plate forming part of said manually operable means and carried by said shaft means for axial movement therealong, and a pair of stop pins fixedly carried by said plate and being aligned with said openings of said rings when said rings are in their rest positions, respectively, so that said plate may be manually moved along said shaft means to locate said stop pins respectively in said openings for optionally locking said rings to each other for simultaneous movement with said lever about the common axis of said rings when said manually operable means places said moving means in said second position thereof.

9. In a camera capable of automatically determining combinations of exposure time and exposure aperture which will provide proper exposures, in combination, support means; coaxial rotary exposure time setting means and exposure aperture setting means turnably carried by said support means for rotary movement about a common axis; manually releasable drive means carried by said support means to be manually released for movement at the will of the operator; and motion transmitting means operatively connected to said drive means to be moved thereby and operatively engaging said exposure time setting means and said exposure aperture setting means for transmitting to the latter movement of said drive means, said motion transmitting means having three positions in one of which said motion transmitting means transmits movement of said drive means first to one of said setting means and then to the other of said setting means, and in a second of which said motion transmitting means transmits movement of said drive means first to the other of said setting means and then to said one of said setting means, and in the third of which said motion transmitting means transmits movement of said drive means to both of said setting means.

10. In a camera capable of automatically determining combinations of exposure time and exposure aperture which will provide proper exposures, in combination, support means; coaxial rotary exposure time setting means and exposure aperture setting means turnably carried by said support means for rotary movement about a common axis; manually releasable drive means carried by said support means to be manually released for movement at the will of the operator; motion transmitting means operatively connected to said drive means to be moved thereby and operatively engaging said exposure time setting means and said exposure aperture setting means for transmitting to the latter movement of said drive means, said motion transmitting means having three positions in one of which said motion transmitting means transmits movement of said drive means first to one of said setting means and then to the other of said setting means, and in a second of which said motion transmitting means transmits movement of said drive means first to the other of said setting means and then to said one of said setting means, and in the third of which said motion transmitting means transmits movement of said drive means to both of said setting means; and manually operable cam means carried by said support means and cooperating with said motion transmitting means for selectively placing the latter in one of said three positions thereof.

11. In a camera capable of automatically determining combinations of exposure time and exposure aperture which will provide proper exposures, in combination, support means; coaxial rotary exposure time setting means and exposure aperture setting means turnably carried by said support means for rotary movement about a common axis; manually releasable drive means carried by said support means to be manually released for movement at the will of the operator; motion transmitting means operatively connected to said drive means to be moved thereby and operatively engaging said exposure time setting means and said exposure aperture setting means for transmitting to the latter movement of said drive means, said motion transmitting means having three positions in one of which said motion transmitting means transmits movement of said drive means first to one of said setting means and then to the other of said setting means, and in a second of which said motion transmitting means transmits movement of said drive means first to the other of said setting means and then to said one of said setting means, and in the third of which said motion transmitting means transmits movement of said drive means to both of said setting means; and manually operable lever means turnably carried by said support means and cooperating with said motion transmitting means for selectively placing the latter in one of said three positions thereof.

12. In a camera capable of automatically determining combinations of exposure time and exposure aperture which will provide proper exposures, in combination, support means; coaxial rotary exposure time setting means and exposure aperture setting means turnably carried by said support means for rotary movement about a common axis; manually releasable drive means carried by said support means to be manually released for movement at the will of the operator; motion transmitting means operatively connected to said drive means to be moved thereby and operatively engaging said exposure time setting means and said exposure aperture setting means for transmitting to the latter movement of said drive means, said motion transmitting means having three positions in one of which said motion transmitting means transmits movement of said drive means first to one of said setting means and then to the other of said setting means, and in a second of which said motion transmitting means transmits movement of said drive means first to the other of said setting means and then to said one of said setting means, and in the third of which said motion transmitting means transmits movement of said drive means to both of said setting means; and manually shiftable slide means carried by said support means and cooperating with said motion transmitting means for selectively placing the latter in one of said three positions thereof.

13. In a camera as recited in claim 1, support means supporting both of said setting means for rotary movement about a common axis, said moving means including a pair of pins respectively carried by said exposure time and exposure aperture setting means and extending into a common plane normal to the common axis of both of said setting means, said moving means also including a manually releasable rotary drive means also supported by said support means for rotary movement about said common axis and a pair of motion transmitting members carried by said drive means for rotary movement therewith and being movable with respect to said drive means, said pair of motion transmitting members being adapted to cooperate with said pair of pins for transmitting movement of said drive means to said exposure time and said exposure aperture setting means, respectively, said manually operable means including a cam means cooperating with said pair of motion transmitting members for placing a selected one of the latter in an operative position with respect to said pair of pins, respectively, or for placing both of said motion transmitting members in operative relations with respect to said pins so that either said exposure time and said exposure aperture means may be operated in a selected sequence or they may be operated simultaneously.

14. In a camera as recited in claim 13, said cam means having a camming projection which according to the angular position of said cam means will cooperate with one or the other of said motion transmitting members for placing one or the other of said motion transmitting members in engagement with one or the other of said pins.

15. In a camera as recited in claim 14, said cam means having a pair of additional projections both of which simultaneously engage the pair of motion transmitting members when said cam means is in a predetermined angular position, the curvature of said cam means when it is in said latter predetermined position cooperating with said pair of motion transmitting members for producing a turning of said exposure time and said exposure aperture setting means which is equal to one-half of the angle through which said drive means turns.

16. In a camera as recited in claim 13, each of said motion transmitting members being in the form of a two-armed lever turnably carried by said drive means and having a pair of opposed free end portions one of which cooperates with said cam means and the other of which cooperates with one of said pins.

17. In a camera as recited in claim 1, support means supporting both of said setting means for rotary movement about a common axis, said moving means including a pair of pins respectively fixed to said setting means and extending parallel to said axis through a common plane and a rotary drive means located adjacent said plane and supported for rotation about said axis by said support means, said moving means also including a pair of motion transmitting means respectively carried by said drive means for rotary movement therewith and adapted to cooperate respectively with said pins for transmitting movement of said drive means to said pins to actuate the exposure time and exposure aperture setting means, said manually operable means including a cam means cooperating with said pair of motion transmitting means for controlling the latter to actuate said pins in a selected sequence during rotation of said rotary drive means or for actuating said pins simultaneously when said moving means is in said second position thereof.

18. In a camera as recited in claim 17, said drive means, when said cam means positions only one of said motion transmitting means in operative engagement with one of said pins, engaging the other of said pins after said one pin has been moved through a predetermined angle by said one motion transmitting means.

19. In an automatic camera capable of automatically determining combinations of exposure time and exposure aperture which will provide proper exposures, in combination, support means; rotary exposure time setting means carried by said support means for rotary movement about a predetermined axis from a predetermined rest position; rotary exposure aperture setting means coaxial with said exposure time setting means and supported for rotary movement about said axis by said support means also from a predetermined rest position; rotary drive means also supported for rotation about said axis by said support means; motion transmitting means carried by said drive means for rotary movement therewith and cooperating with both of said setting means for transmitting movement of said drive means to both of said setting means, said motion transmitting means having three operating positions; manually operable means cooperating with said motion transmitting means for selectively placing the latter in one of three operating positions, said exposure time setting means having a first stop at a first radial distance from said axis engaged by said motion transmitting means when it is in one of said positions thereof and said exposure aperture setting means having a first stop at the same radial distance from said axis as said first stop of said exposure time setting means but angularly displaced from the latter in the path of movement of said motion transmitting means so that when the latter is in said one position said drive means will operate through said motion transmitting means to turn first said exposure time setting means and then said exposure aperture setting means, said exposure aperture setting means having a second stop at a second radial distance from said axis engaged by said motion transmitting means when the latter is in a second of said positions thereof and said exposure aperture setting means is in its rest position, said exposure time setting means having a second stop at said second radial distance from said axis angularly displaced from said second stop of said exposure aperture setting means and in the path of movement of said motion transmitting means to be engaged by the latter after said motion transmitting means has moved said exposure aperture setting means through a predetermined angle when said drive means operates and said motion transmitting means is in said second position thereof, and both of said setting means respectively having third stops respectively located at a third radial distance from said axis and both engaged by said motion transmitting means when the latter is in the third of said positions thereof and both of said setting means are in their rest positions, respectively, so that both of said setting means will be simultaneously driven by said drive means through said motion transmitting means when the latter is in said third position thereof.

20. In a camera as recited in claim 19, a lever carrying said motion transmitting means and pivotally connecting the latter to said drive means and a spring operatively connected to said motion transmitting means for maintaining the latter in engagement with said manually operable means for selectively placing said motion transmitting means in one of said three positions thereof.

21. In a camera as recited in claim 19, said exposure time and said exposure aperture setting means including annular members surrounding the optical axis of the camera, said optical axis forming the common axis of both of said setting means and said drive means and said motion transmitting means being movable substantially radially with respect to the optical axis during movement between said three positions thereof.

22. In a camera as recited in claim 19, said exposure time and said exposure aperture setting means including annular members surrounding the optical axis of the camera, said optical axis forming the common axis of both of said setting means and said drive means and said motion transmitting means being movable substantially radially with respect to the optical axis during movement between said three positions thereof, said motion transmitting means being in the form of an elongated rod extending substantially parallel to the optical axis and a stationary guide member carried by said support means and formed with a substantially radial cutout in which said rod moves between said positions thereof, said guide member having a pair of concentric arcuate cutouts in which said rod is guided when in the first two of said three positions thereof and said guide being formed with a third arcuate cutout oppositely inclined to said concentric cutout and guiding said rod when the latter is in said third position thereof.

23. In a camera as recited in claim 19, said exposure time and said exposure aperture setting means including annular members surrounding the optical axis of the camera, said optical axis forming the common axis of both of said setting means and said drive means and said motion transmitting means being movable substantially radially with respect to the optical axis during movement between said three positions thereof, said motion transmitting means being in the form of an elongated rod extending substantially parallel to the optical axis and a stationary guide member carried by said support means and formed with a substantially radial cutout in which said rod moves between said positions thereof, said guide member having a pair of concentric arcuate cutouts in which said rod is guided when in the first two of said three positions thereof and said guide being formed with a third arcuate cutout oppositely inclined to said concentric cutout and guiding said rod when the latter is in said third position thereof, the third arcuate cutout which guides said rod when the latter is in the third of said positions thereof having a curvature which transmits to both of said setting means one-half the turning movement of said drive means when said rod is in said third position thereof.

24. In a camera as recited in claim 19, each of said setting means including a pair of rings one of which has a pair of projections and the other of which has a stop, a first spring means operatively connected to said one ring for urging one of said projections thereof against a stationary stop of the camera to determine the rest position of each setting means and a second spring interconnecting both of said rings of each setting means and urging said second projection of said one ring against said stop of said other ring so as to determine the angular position of said rings with respect to each other in the rest position of each setting means.

25. In a camera as recited in claim 1, said manually operable means including a camming surface which engages said moving means to position the latter according to the position of said camming surface, and said manually operable means including a member supported for rotation about the optical axis of the camera and said camming surface forming part of said member and having different portions located at different radial distances from said optical axis, respectively.

26. In a camera as recited in claim 1, said manually operable means including a two-armed lever turnably supported, having one arm accessible to the operator, and having another arm engaging said moving means for positioning the latter according to the angular position of said lever.

27. In a camera as recited in claim 1, said manually operable means including a slide member guided for movement along a straight line, having a portion accessible to the operator, and having another portion which engages said moving means to position the latter.

28. In a camera as recited in claim 1, said manually operable means being supported for axial shifting movement in a direction parallel to the optical axis to a plurality of positions for positioning said moving means.

29. In a camera as recited in claim 1, releasable detent means cooperating with said manually operable means for releasably maintaining the latter in a position which provides the selected type of operation.

30. In a camera as recited in claim 1, both of said setting means respectively carrying scales for indicating to the operator settings of both of said setting means when the latter are manually operated and said manually operable means carrying a cover means which covers said scales in all positions except that where said setting means are manually operated.

31. In a camera capable of automatically determining combinations of exposure time and exposure aperture which will provide proper exposures, in combination, support means; exposure time setting means and exposure aperture setting means carried by said support means; operating means cooperating with both of said setting means for operating the same according to a selected one of the plurality of different types of operation; manually operable selecting means cooperating with said operating means for setting the latter to provide the selected type of operation, said manually operable selecting means having a position where said operating means releases both of said setting means for manual operation; a single manually operable member operatively connected to said operating means for setting the latter into operation for all types of operation except that where said selecting means is set for manual operation of said setting means; and lock means placed by said manually operable selecting means in a position locking said single manually operable member when said selecting means is set for manual operation of said setting means.

32. In a camera capable of automatically determining combinations of exposure time and exposure aperture which will provide proper exposures, in combination, support means; exposure time setting means and exposure aperture setting means carried by said support means; operating means cooperating with both of said setting means for operating the same according to a selected one of the plurality of different types of operation; manually operable selecting means cooperating with said operating means for setting the latter to provide the selected type of operation, said manually operable selecting means having a position where said operating means releases both of said setting means for manual operation; a single manually operable member operatively connected to said operating means for setting the latter into operation for all types of operation except that where said selecting means is set for manual operation of said setting means; and lock means placed by said manually operable selecting means in a position locking said single manually operable member when said selecting means is set for manual operation of said setting means, said manually operable member having a recess and said lock means including a spring operated pin urged toward said recess, said manually operable selecting means having a control surface engaged by said pin and allowing said spring to move said pin into said recess only when said selecting means is set for manual operation.

33. In a camera capable of automatically determining combinations of exposure time and exposure aperture which will provide proper exposures, in combination, support means; exposure time setting means and exposure aperture setting means carried by said support means; operating means cooperating with both of said setting means for operating the same according to a selected one of the plurality of different types of operation; manually operable selecting means cooperating with said operating means for setting the latter to provide the selected type of operation, said manually operable selecting means having a position where said operating means releases both of said setting means for manual operation; a single manually operable member operatively connected to said operating means for setting the latter into operation for all types of operation except that where said selecting means is set for manual operation of said setting means; and lock means placed by said manually operable selecting means in a position locking said single manually operable member when said selecting means is set for manual operation of said setting means, both of said setting means being respectively formed with cutouts in which said lock means is located when said lock means locks said manually operable member so that both of said setting means can be moved with respect to said lock means.

34. In a camera capable of automatically determining combinations of exposure time and exposure aperture which will provide proper exposures, in combination, support means; exposure time setting means and exposure aperture setting means carried by said support means; operating means cooperating with both of said setting means for operating the same according to one of a plurality of different types of operation; manually operable selecting means cooperating with said operating means for actuating the latter to provide a selected type of operation, said selecting means also having a position where both of said setting means are free from said operating means so that both of said setting means may then be manually operated; spring means cooperating with both of said setting means for yieldably maintaining the latter in rest positions, respectively; and detent means cooperating with each of said setting means for yieldably maintaining the latter in opposition to said spring means in the position to which each setting means is manually set by the operator when said manually operable selecting means sets the camera for manual operation.

35. In a camera capable of automatically determining combinations of exposure time and exposure aperture which will provide proper exposures, in combination, support means; exposure time setting means and exposure aperture setting means carried by said support means; operating means cooperating with both of said setting means for operating the same according to one of a plurality of different types of operation; manually operable selecting means cooperating with said operating means for actuating the latter to provide a selected type of operation, said selecting means also having a position where both of said setting means are free from said operating means so that both of said setting means may then be manually operated; spring means cooperating with both of said setting means for yieldably maintaining the latter in rest position, respectively; and detent means cooperating with each of said setting means for yieldably maintaining the latter in opposition to said spring means in the position of which each setting means is manually set by the operator when said manually operable selecting means sets the camera for manual operation, each of said setting means including a pair of coaxial turnable rings one of which is actuated by said operating means and the other of which actuates the elements which adjust the exposure time in the case of said exposure time setting means or the exposure aperture in the case of said exposure setting means, said spring means being in the form of a spring located between each pair of rings and urging them to a predetermined angular position one with respect to the other.

36. In a camera capable of automatically determining combinations of exposure time and exposure aperture which will provide proper exposures, in combination, support means; exposure time setting means and exposure aperture setting means carried by said support means; operating means cooperating with both of said setting means for operating the same according to one of a plurality of different types of operation; manually operable selecting means cooperating with said operating means for actuating the latter to provide a selected type of operation, said selecting means also having a position where both of said setting means are free from said operating means so that both of said setting means may then be manually operated; spring means cooperating with both of said setting means for yieldably maintaining the latter in rest positions, respectively; and detent means cooperating with each of said setting means for yieldably maintaining the latter in opposition to said spring means in the position of which each setting means is manually set by the operator when said manually operable selecting means sets the camera for manual operation, each of said setting means including a pair of coaxial turnable rings one of which is actuated by said operating means and the other of which actuates the elements which adjust the exposure time in the case of said exposure time setting means or the exposure aperture in the case of said exposure setting means, said spring means being in the form of a spring located between each pair of rings and urging them to a predetermined angular position one with respect to the other, each detent means including a leaf spring fixedly carried by said one ring of each of said setting means which is actuated by said operating means and having a springy tooth overlying the periphery of the other ring of each of said setting means and said other ring of each of said setting means having a plurality of teeth engaged by said springy tooth, the latter tooth cooperating with an end of the series of teeth of said other ring when said selecting means is set for a position other than manual operation and cooperating with a selected one of the remaining teeth for maintaining said other ring in a position manually selected by the operator.

37. In a camera capable of automatically determining combinations of exposure time and exposure aperture which will provide proper exposures, in combination, support means; exposure time setting means and exposure aperture setting means carried by said support means; operating means for operating both of said setting means to provide one of a plurality of different types of operations; manually operable selecting means cooperating with said operating means for setting the latter to provide a selected type of operation, said setting means having a position freeing both of said setting means from said operating means so that both of said setting means may then be manually operated; spring means cooperating with both of said setting means for urging the latter to predetermined rest positions; detent means cooperating with each of said setting means for releasably maintaining the same in opposition to said spring means in positions in which the setting means is manually set by the operator, said exposure time setting means having settings for exposure times longer than those provided during automatic operation of the camera; and additional detent means cooperating with said exposure time setting means for yieldably maintaining the latter at the positions of exposure times longer than those provided during automatic operation.

38. In a camera as recited in claim 1, said manually operable means having a portion which forms part of one of said setting means.

39. In a camera as recited in claim 1, said manually operable means having a portion which forms part of said exposure time setting means.

40. In a camera as recited in claim 1, said manually operable means locking both of said setting means to each other for simultaneous operation in said second position of said moving means, and said moving means including a leaf spring means cooperating alternately with both of said setting means for braking the operation thereof in said third position of said moving means.

41. In a camera as recited in claim 40, said leaf spring means including a leaf spring which is angularly bent and said manually operable means cooperating with said leaf spring for deflecting the latter between positions where portions of said leaf spring respectively engage said exposure time and exposure aperture setting means when said moving means is placed by said manually operable means in said third position thereof.

42. In a camera as recited in claim 1, said moving means including a differential means which cooperates with both of said setting means for operating the latter according to the position of said moving means, said manually operable means cooperating with said differential means for setting the latter to provide a selected position of said moving means and said manually operable means including an elongated sleeve axially shiftable along a shaft, and a detent means cooperating with said sleeve and shaft for releasably maintaining said sleeve on said shaft in a plurality of different axial positions respectively providing said different positions of said moving means.

43. In a camera as recited in claim 1, detent means cooperating with both of said setting means for yieldably maintaining the latter to the positions in which they are manually moved when said moving means has been placed by said manually operable means in said first position thereof, said detent means being out of operative relation with respect to both of said setting means in all except said first position of said moving means and said manually operable means placing said detent means in its operative relation with respect to both of said setting means when said moving means is placed by said manually operable means in said first position thereof.

44. In a camera as recited in claim 43, said detent means including a slide member guided for movement and said manually operable means including a pin which engages said slide member when said manually operable means places said moving means in said first position thereof, for placing said slide member in a position which places said detent means in its operative relation with respect to both of said setting means.

45. In a camera as recited in claim 43, said detent means including a cam shaft carrying a pair of cams, a pair of levers engaging said cams, a row of teeth carried by each of said setting means, and a pair of pins respectively carried by said levers and respectively engaging said rows of teeth when said detent means is in its operative relation with respect to both of said setting means.

References Cited in the file of this patent

UNITED STATES PATENTS

| | | |
|---|---|---|
| 2,868,095 | Gebele | Jan. 13, 1959 |
| 2,925,760 | Broschke | Feb. 23, 1960 |
| 2,969,004 | Gebele | Jan. 24, 1961 |
| 2,990,758 | Saver et al. | July 4, 1961 |
| 3,093,040 | Kiper | June 11, 1963 |